(12) United States Patent
Ueyama et al.

(10) Patent No.: US 8,406,923 B2
(45) Date of Patent: Mar. 26, 2013

(54) APPARATUS FOR DETERMINING PICKUP POSE OF ROBOT ARM WITH CAMERA

(75) Inventors: Tsuyoshi Ueyama, Toyota (JP); Minoru Takahashi, Tokoname (JP)

(73) Assignee: Denso Wave Incorporated, Tokyo (JP)

( * ) Notice: Subject to any disclaimer, the term of this patent is extended or adjusted under 35 U.S.C. 154(b) by 705 days.

(21) Appl. No.: 12/382,228

(22) Filed: Mar. 11, 2009

(65) Prior Publication Data

US 2009/0234502 A1  Sep. 17, 2009

(30) Foreign Application Priority Data

Mar. 12, 2008 (JP) .................. 2008-062671

(51) Int. Cl.
*G05B 15/00* (2006.01)
*G05B 19/00* (2006.01)
(52) U.S. Cl. ....................... 700/259; 700/245
(58) Field of Classification Search .................. None
See application file for complete search history.

(56) References Cited

U.S. PATENT DOCUMENTS

| | | | | |
|---|---|---|---|---|
| 4,744,719 A * | 5/1988 | Asano et al. | ................ | 414/730 |
| 4,831,547 A * | 5/1989 | Ishiguro et al. | ............. | 700/247 |
| 4,933,864 A * | 6/1990 | Evans et al. | .................. | 701/207 |
| 4,954,962 A * | 9/1990 | Evans et al. | .................. | 701/28 |
| 5,040,116 A * | 8/1991 | Evans et al. | .................. | 701/28 |
| 5,051,906 A * | 9/1991 | Evans et al. | .................. | 701/28 |
| 5,148,591 A * | 9/1992 | Pryor | ........................ | 29/407.04 |
| 5,380,978 A * | 1/1995 | Pryor | ........................ | 219/121.64 |
| 5,394,100 A * | 2/1995 | Bohler et al. | ............ | 324/750.23 |
| 5,465,037 A * | 11/1995 | Huissoon et al. | ........ | 318/568.11 |
| 5,528,505 A * | 6/1996 | Granger et al. | ............... | 700/195 |
| 5,903,663 A * | 5/1999 | Abend | .......................... | 382/152 |
| 6,243,621 B1 * | 6/2001 | Tao et al. | ...................... | 700/245 |
| 6,295,737 B2 * | 10/2001 | Patton et al. | ................... | 33/18.1 |
| 6,642,922 B1 | 11/2003 | Noda | | |
| 7,177,740 B1 * | 2/2007 | Guangjun et al. | ............. | 701/34 |
| RE40,212 E * | 4/2008 | Watanabe et al. | ............ | 700/262 |
| 7,571,025 B2 * | 8/2009 | Bischoff | ........................ | 700/248 |
| 7,768,549 B2 * | 8/2010 | Cofer | ........................... | 348/152 |
| 2006/0214097 A1 * | 9/2006 | Wang et al. | ................ | 250/252.1 |

FOREIGN PATENT DOCUMENTS

| | | |
|---|---|---|
| JP | A-08-313225 | 11/1996 |
| JP | A-11-242513 | 9/1999 |

\* cited by examiner

*Primary Examiner* — Khoi Tran
*Assistant Examiner* — Bhavesh V Amin
(74) *Attorney, Agent, or Firm* — Oliff & Berridge, PLC

(57) ABSTRACT

In an apparatus, a coordinate obtaining unit drives a robot to move a camera opposing a workpiece in a first direction such that the workpiece is captured in an FOV of the camera. The coordinate obtaining unit obtains second and third coordinates of a preset point of the robot arm in respective second and third axes of a three-dimensional coordinate system with the workpiece being captured in the FOV. The first, second, and third coordinates are defined as coordinates of a temporally defined reference point of the workpiece in the three-dimensional coordinate system. A pose determining unit drives, at a given timing, the robot arm to determine a pose of the preset point based on a positional relationship between the first, second, and third coordinates of the temporally defined reference point of the workpiece and actual coordinates of the preset point of the robot arm.

6 Claims, 13 Drawing Sheets

APPARATUS FOR DETERMINING PICKUP POSE OF ROBOT ARM WITH CAMERA

CROSS REFERENCE TO RELATED APPLICATIONS

This application is based on Japanese Patent Application 2008-052671 filed on Mar. 12, 2008. This application claims the benefit of priority from the Japanese Patent Application, so that the descriptions of which are all incorporated herein by reference.

FIELD OF THE INVENTION

The present invention relates to apparatuses for determining a pickup pose of a robot arm with one end to which a camera is attached. The term "pickup pose" is designed to include at least one o a position of a predetermined point of the robot arm at which an image is to be picked up by the camera, and an orientation of a predetermined reference axis of the robot arm in which an image is to be picked up by the camera.

BACKGROUND OF THE INVENTION

Visual inspection apparatuses, as examples of inspection equipment for visually checking whether parts are properly assembled to their designed positions of workpieces, are designed to carry out such visual checking using a camera attached to one end of a robot arm. An example of such visual inspection apparatuses is disclosed in Japanese Patent Application Publication No. H08-313225.

In such a visual inspection apparatus, a robot arm with one end to which a camera is attached is mounted at its base on, for example, the floor of a facility in which the visual inspection apparatus is installed.

When a workpiece is disposed at a preset check location in the facility, the visual inspection apparatus works to move the robot arm to thereby cause the robot arm to sequentially take target pickup poses in each of which an image of the workpiece is to be picked up by the camera.

The visual inspection apparatus also works to pick up an image in each of the target pickup poses, to process the picked-up images in the respective target pickup poses, and to carry out visual check of the workpiece based on the result of the image processing.

In the visual inspection apparatus, the target pickup poses in each of which an image of a workpiece is to be picked up by the camera have been taught to be stored in a memory of the visual inspection apparatus.

In order to determine such target pickup poses of a robot arm with one end to which a camera is attached, a teaching device is normally used. The teaching device is designed to be manually operable and to remotely access a controller of the robot arm to thereby instruct the controller to move the robot arm to desired locations.

Specifically, a user manually operates the teaching device to instruct the controller to move the robot arm while monitoring images of a workpiece disposed at the check location; these images are sequentially picked up by the camera in different pickup poses and sequentially displayed on a display device.

When determining that an image of the workpiece picked up by the camera located in a pickup pose is a desired image for visual check of the workpiece, the user operates the teaching device to store therein the pickup pose as a target pickup pose.

On the other hand, U.S. Pat. No. 6,542,922 corresponding to Japanese Patent Application Publication No. H11-242513 discloses a technique for determining a target location of a robot in simulations; this technique will be referred to as "simulation technique" hereinafter.

Specifically, in order to improve the efficiency of determining the target location of the robot, the simulation technique is designed to estimate a virtual spherical object and a virtual camera on the surface of the virtual spherical object.

The simulation technique also virtually moves the virtual camera on the surface of the virtual spherical object in the directions of: the equator of the virtual spherical object, the polar orbit of the virtual spherical object; and the radius thereof to thereby display a tangent plane including one end of the robot arm to which an end effector is attachable.

This easily determines the target location for the one end of the robot arm within the tangent plane.

SUMMARY OF THE INVENTION

As described above, in order to determine target pickup poses of a robot arm with one end to which a camera is attached, a user manually operates a teaching device to move the robot arm while monitoring images of a workpiece disposed at the check location; these images are sequentially picked up by the camera in different pickup poses.

During the target pickup-pose determining routine set forth above the workpiece disposed at the check location may be out of a field of view (FOV) of the camera by mistake. This requires movement of the robot arm so as to recapture the workpiece in the FOV of the camera.

However, after the workpiece is out of the FOV of the camera, the movement of the robot arm so as to capture the workpiece in the FOV of the camera may be difficult for the following reasons:

First, the user may not grasp which orientation the workpiece is located in with respect to the camera because no images of the workpiece are displayed on the screen of the display device.

Second, even if the user has skills in the movement of the robot arm with the teaching device, it may take for the user a lot of time and effort to capture the workpiece in the FOV of the camera. This is because a three-dimensional coordinate system defined in the whole of the robot arm is different from that defined in the one end of the robot to which the camera is attached.

The three-dimensional coordinate system of the whole of the robot arm provides three physical dimensions of space including length, width, and height. Three axes defining the three-dimensional coordinate system are orthogonal to each other. The three-dimensional coordinate system of the whole of the robot arm will be referred to as "robot coordinate system" hereinafter.

If the user has poor skills in the movement of the robot arm with the teaching device, it may further take for the user a lot of time and effort to capture the workpiece in the FOV of the camera.

In order to capture the workpiece disposed at the check location in the FOV of the camera, it is considered that such a visual inspection apparatus is designed to apply the simulation technique set forth above.

Specifically, the visual inspection apparatus defines the center of the vertical spherical object as the center of the workpiece. The visual inspection apparatus also moves the location of the camera in the directions o the equator of the virtual spherical object; the polar orbit of the virtual spherical object; and the radius thereof so as to continuously capture the workpiece disposed at the check location in the FOV of the camera.

When the visual inspection apparatus uses the simulation technique in order to capture the workpiece disposed at the check location in the FOV of the camera, it may be necessary for a user to manually input, to the visual inspection apparatus, a center position of the workpiece as a corresponding location in the robot coordinate system of the robot arm.

However, the center position of the workpiece can be inputted to the visual inspection apparatus as a corresponding location in the robot coordinate system of the robot arm only when the location of an origin of the robot coordinate system and the orientation of each axis thereof an grasped.

It is assumed that the origin of the robot coordinate system is set at the bottom of the base installed on, for example, the floor of a facility and that a horizontal plane defined by the length and width axes (directions) of the robot coordinate system is set on the bottom of the base.

In this assumption, a user comparatively easily measures the height of the origin of the robot coordinate system relative to the height of bottom of the base, and therefore, comparatively easily measures coordinate location of the center position of the workpiece in the height direction (height axis) relative to the height of the origin.

However, it may be difficult for a user to grasp coordinate location of the origin of the robot coordinate system in the length and width directions (length and width axes). This is because the origin is hidden by the base so that the user cannot view the actual location of the origin of the robot coordinate system.

In addition, it may be difficult for the user to grasp the orientations of the length and height directions of the origin of the robot coordinate system. This is because the orientations of the length and height directions of the origin of the robot coordinate system vary from robot-arm to robot-arm.

Therefore, it may be difficult for the user to manually measure the center position of the workpiece as the coordinate location in the robot coordinate system.

In view of the background, an object of an aspect of the present invention is to provide apparatuses for determining a pickup pose of a robot with a camera; these apparatuses are designed to easily capture a workpiece within an FOV of the camera.

According to one aspect of the present invention, there is provided an apparatus for determining, in a three-dimensional coordinate system, a pickup pose of a robot arm with a camera when an image of a workpiece is to be picked up by the camera. The workpiece is mounted on a reference plane. The apparatus includes an input unit configured to input a first coordinate of the workpiece in a first axis of the three-dimensional coordinate system. The first axis is defined to be directed in orthogonal to the reference plane. The apparatus includes a coordinate obtaining unit configured to: drive the robot to move the camera opposing the workpiece in the first direction such that at least part of the workpiece is captured in a field of view (FOV) of the camera, and obtain second and third coordinates of a preset point of the robot arm in respective second and third axes of the three-dimensional coordinate system with the at least part of the workpiece being captured in the field of view of the camera. The second and third axes are orthogonal to the first axis. The first, second, and third coordinates are defined as coordinates of a temporally defined reference point of the workpiece in the three-dimensional coordinate system. The apparatus includes a pose determining unit configured to drive, at a given timing, the robot arm to determine a pose of the preset point of the robot arm based on a positional relationship between the first, second, and third coordinates of the temporally defined reference point of the workpiece and actual coordinates of the preset point of the robot arm.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the FIGS. 1 to 15. In the embodiment, the present invention is applied to a robot system RS.

For example, the robot system RS is applied to a visual inspection apparatus for visually checking whether parts are properly mounted to their proper positions of assembled workpieces 19 during the final process of an assembly line of the workpieces 19.

Figure 1:
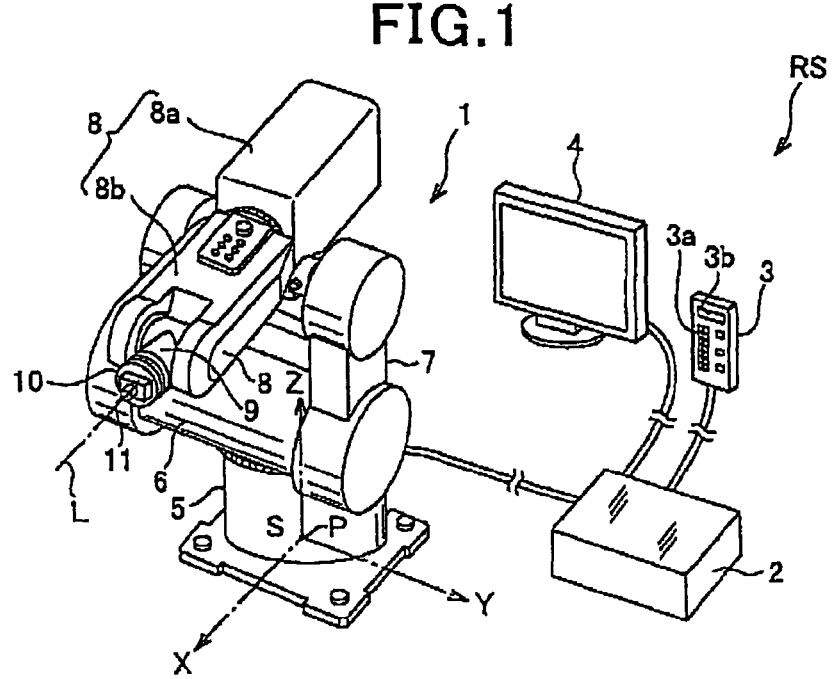
FIG. 1 is a perspective view schematically illustrating an example of the hardware configuration of a robot system according to an embodiment of the present invention.

Referring to FIG. 1, the robot system RS is preferably equipped with a robot body 1, a controller 2 electrically connected thereto via a cable and designed to control the robot body 1, a teaching pendant 3 electrically connected to the controller 2 via a cable, and a display 4 electrically connected to the controller 2 via a cable.

The teaching pendant 3 is equipped with a manually operable portion, such as a touch panel, 3a and a display, such as an LCD display, 3b. User's manual operations of the manually operable portion 3a allow various instructions for the controller 2 to be inputted to the teaching pendant 3. The display 3b works to display various items of information.

The robot body 1 is designed as, for example, an articulated robot body.

Figure 4A:
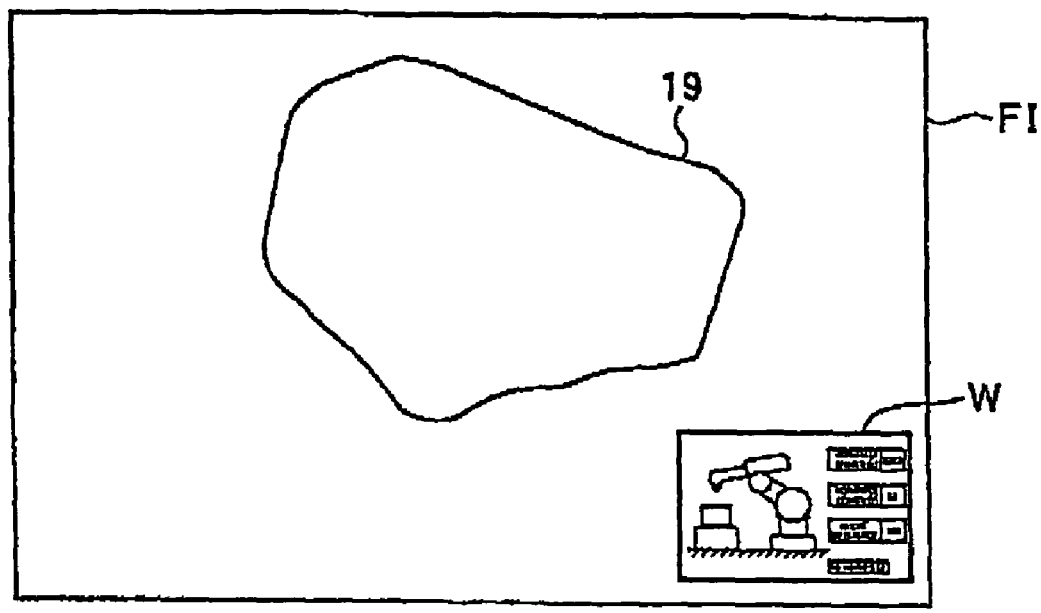
FIG. 4A is a view schematically illustrating a planer image of a checked workpiece displayed on the screen of a display and according to the embodiment.
Figure 4B:
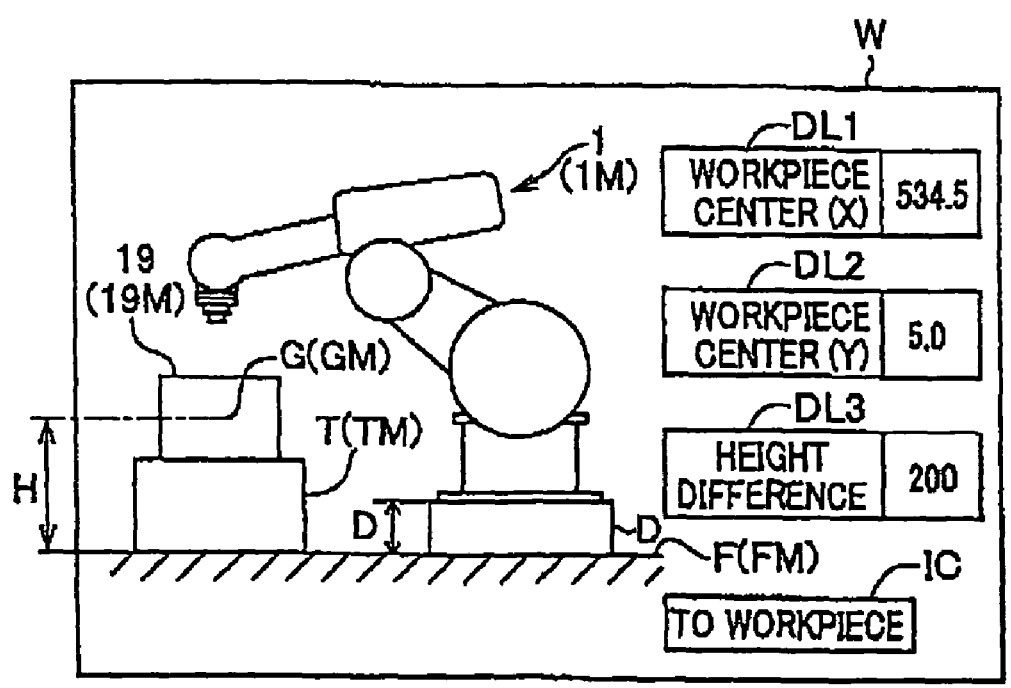
FIG. 4B is a view schematically illustrating a window on the screen of the display in which three-dimensional graphical models of the robot system and graphical user-interface sections are displayed.

The robot body 1 consists of a substantially cylindrical base 5 mounted on a horizontal installation surface, such as a flat top surface of a substantially rectangular mount D installed at its flat bottom surface opposing the flat top surface on the floor F of a facility in which the robot system RS is installed (see FIG. 4B).

The robot body 1 consists of a substantially cylindrical shoulder joint 6 mounted on the base 5 such that the center axis of the shoulder joint 6 is orthogonal to the center axis of the base 5.

The shoulder joint 6 is configured to be horizontally rotatable on the base 5 about the center axis (motion axis) of the base 5. Specifically, the base 5 serves as a rotary joint to support the shoulder joint 6 and rotate it around the center axis thereof. The base 5 will also be referred to "base joint" hereinafter.

The robot body 1 consists of a pair of upper arms (upper arm joints) 7. One ends of the pair of upper arms 7 are pivotally supported by both ends of the shoulder joint 6 about the center axis (motion axis) thereof in the vertical direction parallel to the center axis of the base 5. Specifically, the shoulder joint 6 is configured to support the upper arms 7 and rotate them around its center axis.

The robot body 1 consists of a substantially cylindrical arm joint 7a linked to the other ends of the pair of upper arms 7 to be vertically pivoted about its center axis (motion axis) in the vertical direction.

The robot body 1 consists of a substantially cuboid first lower arm 8a mounted at its one major side on an outer peripheral surface of the arm joint 7a to be pivotable together with the arm joint 7a about the center axis thereof in the vertical direction. Specifically, the arm joint 7a is configured to support the first lower arm 8a and pivot it around its center axis.

The robot body 1 consists of a second lower arm 8b extending from the first lower arm 8a and rotatably supported thereby about a center axis of the first lower arm 8a corresponding to a motion axis. Specifically, the first lower arm 8a serves as a joint to support the second lower arm 8b and rotate it around its center axis.

The tip end of the second lower arm 8b is forked. The first and second lower arms 8a and 8b constitute a lower arm link 8.

The robot body 1 consists of a substantially cylindrical wrist joint 9 inserted between the forked ends of the second lower arm 8b and pivotally supported thereby about its center axis (motion axis) in the vertical direction corresponding to the center axial direction of the base 5.

The wrist joint 9 is formed with a substantially ring-shaped flange 10 projecting therefrom. The wrist joint 9 is configured to support the flange 10 and pivot it around its center axis.

The flange 10 is configured to be rotatable about its center axis (motion axis) corresponding to the projecting direction thereof.

The robot body 1 consists of a camera 11 attached onto a tip end surface of the flange 10. The camera 11 has, for example, a single fixed-focus lens and a photodetector with a pixel area (an imaging area), and is arranged such that an optical axis L of the lens of the camera 11 is aligned with the center axis of the flange 10 (see FIG. 1). A field of view (FOV) of the camera 11 has been determined based on, for example, the size and a focus length of the lens, and the size of the pixel area of the photodetector of the camera 11.

Figure 2:
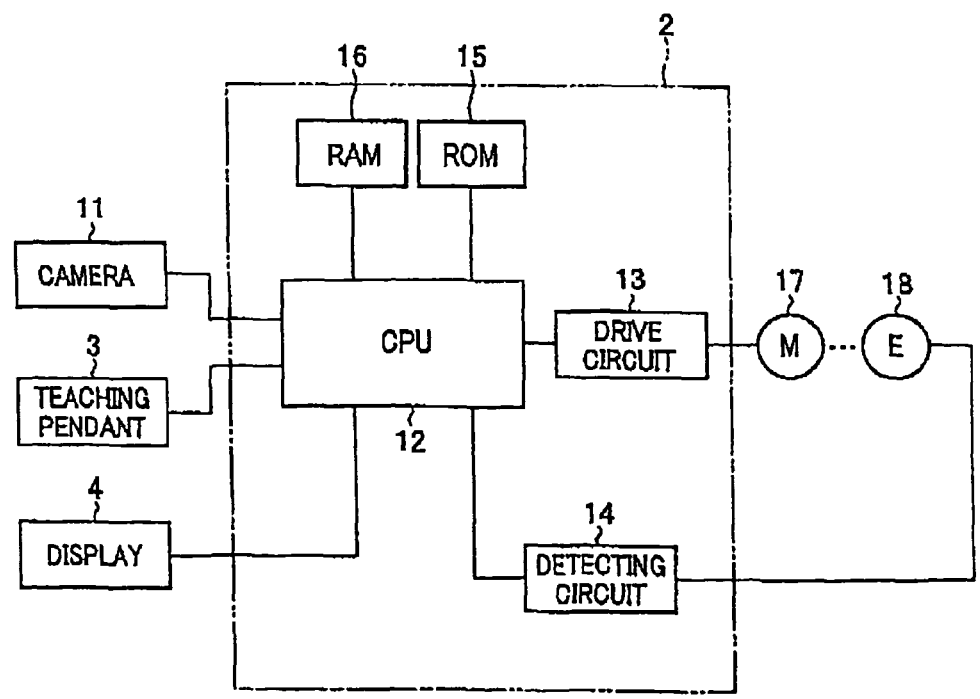
FIG. 2 is a block diagram schematically illustrating an example of the system configuration of the robot system illustrated in FIG. 1.

The robot body 1 includes a plurality of servomotors (M) 17 as actuators (see FIG. 2). The robot body 1 also includes a plurality of rotary encoders (E) 18 each attached to, for example, the rotating shaft of a corresponding one of the servomotors 17 (see FIG. 2).

Specifically, the base (base joint) 5 is integrated with a servomotor 17 and a rotation transmission system, (not shown) that transfers rotation of the servomotor 17 to the shoulder joint 6 to horizontally rotate it.

The shoulder joint 6 is integrated with a servomotor 17 and a rotation transmission system (not shown) that transfers rotation of the servomotor 17 to the upper arms 7 to vertically pivot them together with each other.

The arm joint 7a is integrated with a servomotor 17 and a rotation transmission system (not shown) that transfers rotation of the servomotor 17 to the first lower arm 8a to vertically pivot it.

The first lower arm (arm joint) 8a is integrated with a servomotor 17 and a rotation transmission system (not shown) that transfers rotation of the servomotor 17 to the second lower arm 8b to rotate it about its center axis.

The wrist joint 9 is integrated with a servomotor 17 and a rotation transmission system (not shown) that transfers rotation of the servomotor 17 thereto to vertically pivot itself together with the flange 10.

The flange 10 is integrated with a servomotor 17 and a rotation transmission system (not shown) that transfers rotation of the servomotor 17 thereto to rotate itself together with the camera 11 about its center axis.

Specifically, the base joint 5, the shoulder joint 6, the upper arm joint 7a, the lower arm joint 8a, the wrist joint 9, and the flange 10 of the robot body 1 serve as joints (joint mechanisms) thereof connected to corresponding links of the robot body 1 and configured to provide them motion.

As illustrated in FIG. 2, the controller 2 includes a CPU 12, drive circuits 13 for driving the servomotors 17, a detecting circuit 14, a ROM (Read Only Memory), such as a rewritable nonvolatile memory, 15, and a RAM (Random Access Memory) 16. The elements 13 to 16 are electrically connected to the CPU 12.

The ROM 15 has, for example, stored therein system programs that cause the CPU 12 to control the system resources of the robot system RS. The RAM 16 has, for example, stored therein motion programs of the robot body 1. To the CPU 12, the teaching pendant 3, the display 4, and the camera 11 are electrically connected.

Note that, in FIG. 2, the base joint 5, the shoulder joint 6, the upper arm joint 7a, the lower arm joint 8a, the wrist joint 9, and the flange 10 of the robot body 1 are collectively illustrated as a "joint" by one block.

The servomotors 17 for driving the joints 5, 6, 7a, 8a, 9, and 10 are collectively illustrated as one block to which reference character 17 is assigned in FIG. 2. Similarly, the rotary encoders 18 are collectively illustrated as one block to which reference character 18 is assigned in FIG. 2.

The detecting circuit 14 is operative to detect an actual position and an actual angular velocity of each of the joints 5, 6, 7a, 8a, 9, and 10.

Each of the rotary encoders 18 serves as, for example, a position sensor. Specifically, each of the rotary encoders 18 is configured to output digital pulses that correspond to angular motion (revolution) of the rotating shaft of a corresponding one of the servomotors 17. The pulse signal consisting of the train of the digital pulses is given to the detecting circuit 14.

Based on the pulse signals sent from the rotary encoders 18, the detecting circuit 14 is operative to detect:

an actual rotation angle (angular position) of the shoulder joint 6 relative to the base joint 5;

an actual rotation angle (angular position) of the upper arm 7 relative to the shoulder joint 6;

an actual rotation angle (angular position) of the lower arm link 8 relative to the upper arm 7;

an actual rotation angle (angular position) of the wrist joint 9 relative to the second lower arm 8b; and an actual rotation angle (angular position) of the flange 10 relative to the wrist joint 9.

In addition, the detecting circuit 14 is operative to:

count the number of the pulses in the pulse signal input from each of the rotary encoders 18 per unit of time; and detect, based on the counted result, the actual angular velocity of the rotating shaft of each of the servomotors 17, in other words, the actual angular velocity of each of the joints 5, 6, 7a, 8a, 9, and 10.

The detecting circuit 14 is also operative to give the CPU 12 information indicative of the actual rotation angle and actual angular velocity of each of the joints 5, 6, 7a, 8a, 9, and 10.

Note that, in each of the joints 5, 6, 7a, 8a, 9, and 10, a three-dimensional coordinate system is defined. The three-dimensional coordinate system defined in the base joint 5 is a stationary three-dimensional coordinate system illustrated by reference character "S" in FIG. 1. The stationary three-dimensional coordinate system will be referred to as "robot coordinate system" hereinafter.

The three-dimensional coordinate system defined in each of the remaining joints 6, 7a, 8a, 9, and 10 varies depending on the rotation of each of the joints 5, 6, 7a, 8a, 9, and 10.

The robot coordinate system S has an origin P located at a point on the bottom of the base joint 5 through which the center axis of the base joint 5 passes. A Z-axis "Z" is defined as a physical dimension of height of the robot coordinate system S in the center axis of the base 5 through the origin P; this Z axis is orthogonal to the bottom of the base joint 5 and coaxial to the center axis of the base joint 5.

An X-Y plane formed by an X-axis and a Y-axis is defined in a horizontal plane containing the bottom of the base joint 5 and in orthogonal to the Z-axis. Each of the X-axis and Y-axis passes through the origin P, and the direction of the X-axis and that of the Y-axis orthogonal thereto are freely determined in the horizontal plane in, for example, the design stage of the robot body 1 by a manufacturer thereof.

Note that, information indicative of dimensions of each of the joints 5, 6, 7a, 8a, 9, and 10, such as the length thereof in the corresponding longitudinal direction or corresponding axial direction, are stored beforehand in, for example, the ROM 15 of the controller 2.

The CPU 12 of the controller 2 is operative to execute feedback control of the motion of each of the joints 5, 6, 7a, 8a, 9, and 10 in accordance with the robot motion programs stored in the RAM 16 based on the information sent from the detecting circuit 14 and the information stored in the ROM 15. This feedback control allows a pickup pose of the camera 11 to be in agreement with a desired target pickup pose.

Specifically, the CPU 12 is operative to:

receive the actual rotation angle of each of the joints 5, 6, 7a, 8a, 9, and 10, and the information indicative of the length of each of the joints 5, 6, 7a, 8a, 9, and 10 in the corresponding longitudinal direction or corresponding axial direction; and convert a pose of each of the joints 6, 7a, 8a, 9, and 10 in a corresponding one three-dimensional coordinate system into a pose of each of the joints 6, 7a, 8a, 9, and 10 in the robot coordinate system S. Note mat a pose of a joint in a corresponding three-dimensional coordinate system includes a position of the joint in the corresponding three-dimensional coordinate system and an orientation of the center axis of the joint therein.

Figure 3:
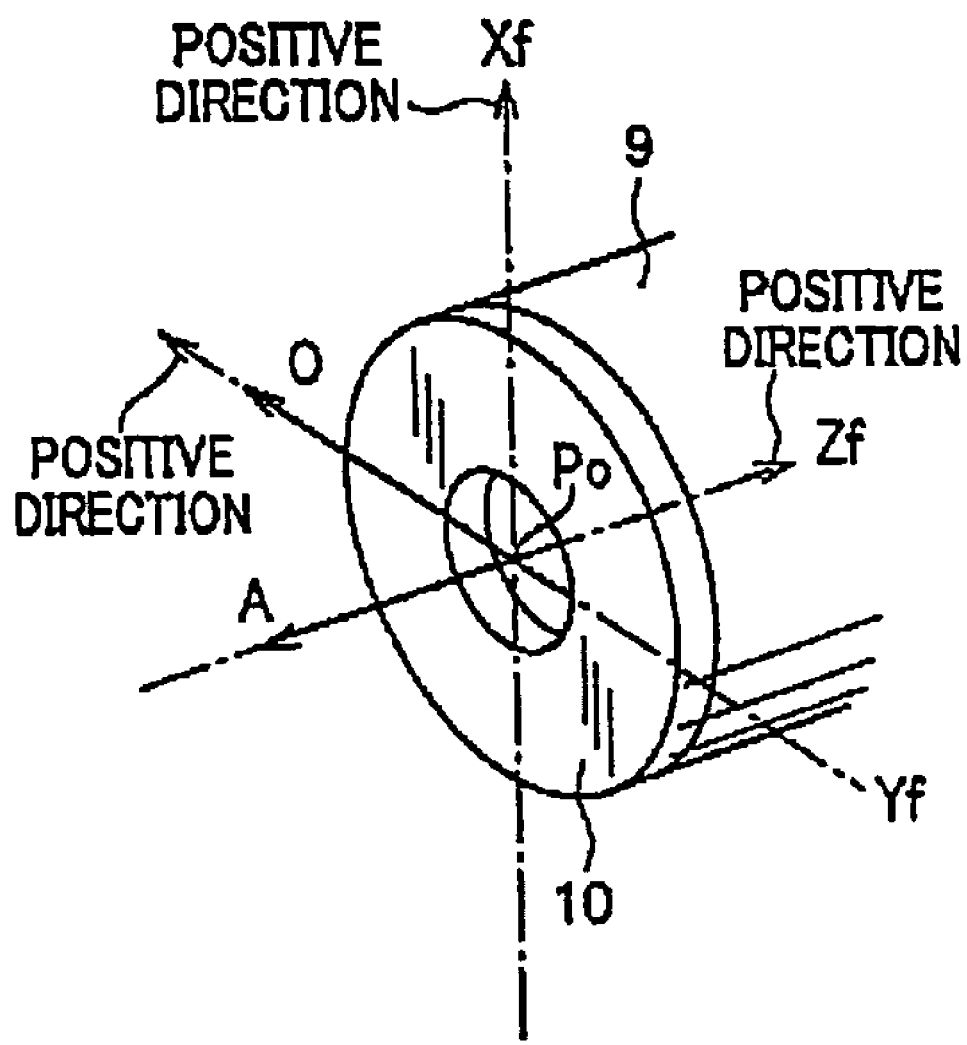
FIG. 3 is a perspective view schematically illustrating a flange attached to one end of a robot body illustrated in FIG. 1 to which a camera is to be mounted.

Referring to FIG. 3, note that the three-dimensional coordinate system defined in the flange 10 has an origin P0 located at the center of the tip end surface of the flange 10. X-axis Xf, Y-axis Yf, and Z-axis Zf of the three-dimensional coordinate system defined in the flange 10 are freely determined as long as they meet the following conditions:

any two axes of the X-, and Z-axes Xf, Yf, and Zf of the three-dimensional coordinate system defined in the flange 10 are determined in the tip end surface of the flange 10; and the remaining one axis of the X-, Y-, and Z-axes Xf, Yf, and Zf of the three-dimensional coordinate system defined in the flange 10 is determined to be coaxial to the center axis of the flange 10; this center axis is orthogonal to the tip end surface of the flange 10.

Specifically, in the embodiment, the X- and Y-axes Xf and Yf are determined in the tip end surface of the flange 10 such that their positive sides are directed as illustrated in FIG. 3. The remaining Z-axis Zf is determined to be coaxial to the center axis of the flange 10 such that its positive side is directed as illustrated in FIG. 3.

A pose (position and orientation) of the robot body 1 means a pose (position and orientation) of the flange 10 is represented as follows.

Specifically, a position of the flange 10 is represented as a position in the robot coordinate system S at which the origin P0 of the three-dimensional coordinate system defined in the flange 10 occupies.

An orientation of the flange 10 is represented by an approach vector A and an orientation vector O.

Approach vector A has a unit length of "1" and projects from the origin P0 in the negative direction of the Z-axis Zf.

Orientation vector has a unit length of "1" and projects from the origin P0 in the positive direction of the Y-axis Yf.

Specifically, an orientation of the flange 10 is represented by an approach vector A and an orientation vector O on the robot coordinate system S when the three-dimensional coordinate system defined in the flange 10 is translated such that the origin PO is in agreement with the origin P of the robot coordinate system S.

In the embodiment, "pickup pose" include a position of the origin P0 of the flange 10 at which an image is to be picked up by the camera 11, and an orientation of a reference vector defined by the approach vector A and the orientation vector O in which an image is to be picked up by the camera 11.

As described above, the robot system RS is, for example, used to the visual inspection apparatus.

The visual inspection apparatus with the robot system RS works to sequentially locate the camera 11 at target pickup poses in each of which an image of an assembled workpiece 19 is to be picked up during the final process of the assembly line of the assembled workpieces 19 (see FIG. 4A).

During the final process of the assembly line, the assembled workpieces 19 are sequentially transferred to a preset check location on a flat mount surface of a mount table T installed on the floor F so that any one of the assembled workpieces 19 is placed at the preset check location (see FIG. 4B). An assembled workpiece 19 is placed at the preset check location will be referred to as "checked workpiece 19" hereinafter.

The visual inspection apparatus also works to sequentially pick up an image of the checked workpiece 19 in each target pickup pose, and visually check, based on the picked-up images, whether parts are properly attached to their proper positions of the checked workpiece 19.

The camera 11 is attached onto the tip end surface of the flange 10 of the robot body 1 such that the optical axis L of the camera 11 is coaxial with the Z-axis Zf of the three-dimensional coordinate system defined in the flange 10; the approach vector A is defined in the Z-axis Zf.

In the embodiment, manipulation of the robot body 1 in accordance with manual operations instructed by the teaching pendant 3 allows determining of target pickup poses and storing them in the controller 2.

Specifically, in the embodiment, a user manually operates the teaching pendant 3 to thereby send, to the controller 2, first instructions.

The first instructions cause the controller 2 to: move the robot body 1 around the checked workpiece 19 while changing a pose of the robot body 1; pick up an image by the camera 11; and display it on the display 4.

When a desired check point of the checked workpiece 19 is contained in the FOV of the camera 11 in a pose of the flange 10 so as to be displayed on the display 4, the user determines that the pose of the flange 10 as a target pickup pose. Thus, the user operates the teaching pendant 3 to thereby send, to the controller 2, second instructions.

The second instructions cause the controller 2 to store the pose of the flange 10 as a target pickup pose in, for example, the RAM 16.

These operations are repeatedly carried out. When all target pickup poses corresponding to all desired check points of the checked workpiece 19 are stored in the RAM 16, the determining of the target pickup poses of the camera 11 is terminated.

Thereafter, in actually checking the checked workpiece 19, the controller 2 is operative to:

drive the robot body 1 to locate it in each of the target pickup poses;

pick up an image of the checked workpiece 19 by the camera 11 in each of the target pickup poses; and process the picked up images to thereby determine whether parts are properly assembled to their designed position of the checked workpiece 19 based on the result of the process.

During the determining routine of target pickup poses, when the checked workpiece 19 is out of the FOV of the camera 11, it is difficult to continue the determining routine of the remaining target pickup poses. Thus, it is necessary to recapture the checked workpiece 19 in the FOV of the camera 11.

The robot system RS according to the embodiment is designed such that simple manipulations of the robot body 1 allow the checked workpiece 19 in the FOV of the camera 11 to be recaptured even if the checked workpiece 19 is out of the FOV of the camera 11.

Specifically, in the embodiment, the controller 2 operates in cooperation with the teaching pendant 3 and the display 4 to thereby carry out a preparation routine before the determining routine.

The preparation routine is designed to temporarily define a reference point, such as a center (center of gravity), of the checked workpiece 19, and determine coordinates of the temporarily defined, reference point of the checked workpiece 19 in the robot coordinate system S.

The system programs stored in the ROM 15 include a GUI (Graphical User Interface) program (software module) that allows a user to manipulate the robot body 1 through graphical elements displayed on the screen of the display 4.

Specifically, when carrying out the preparation routine in response to, for example, instructions sent from the teaching pendant 3, the GUI program causes the controller 2 to display:

respective three-dimensional graphical models 1M, DM, 19M, TM, and FM of the robot body 1, the mount D, the workpiece 19, the mount table T, and the floor F on, for example, the bottom right corner of the screen of the display 4 as a window W;

dialog boxes DL1, DL2, and DL3 in which numerical information is enterable; and a clickable icon IC for inputting an instruction corresponding to the icon IC to the controller 2 when clicked (see FIGS. 4A and 4B).

When a user operates the teaching pendant 3 to input, to the controller 2, an instruction for displaying a cursor (pointer) as an indicator, the controller 2 displays a cursor on the screen of the display 4. User's manual operation of the teaching pendant 3 allows the controller 2 to move a new position on the screen and to click it to thereby selecting a command corresponding to the clicked position.

The controller 2 works to move the robot body 1 in accordance with user's manual operations of the teaching pendant 3 while moving the three-dimensional graphical model 1M corresponding to the robot body 1 together therewith.

Referring to FIG. 4B, the dialog box DL1 represents a dialog box on which an X coordinate of the temporarily defined reference point of the checked workpiece 19 can be displayed, and the dialog box DL2 represents a dialog box on which a Y coordinate of the temporarily defined reference point of the checked workpiece 19 can be displayed.

The dialog box DL3 represents a clickable dialog box on which the difference between the height of the temporarily defined reference point of the checked workpiece 19 and that of the mount D in the Z-axis of the robot coordinate system S can be inputted.

The clickable icon IC is labeled as "TO WORKPIECE". The clickable icon IC works to instruct the controller 2 to carry out a reference point pickup routine illustrated in FIG. 7 described hereinafter when clicked.

Next, the preparation routine and manual operations associated therewith according to the embodiment will be described hereinafter.

Figure 5:
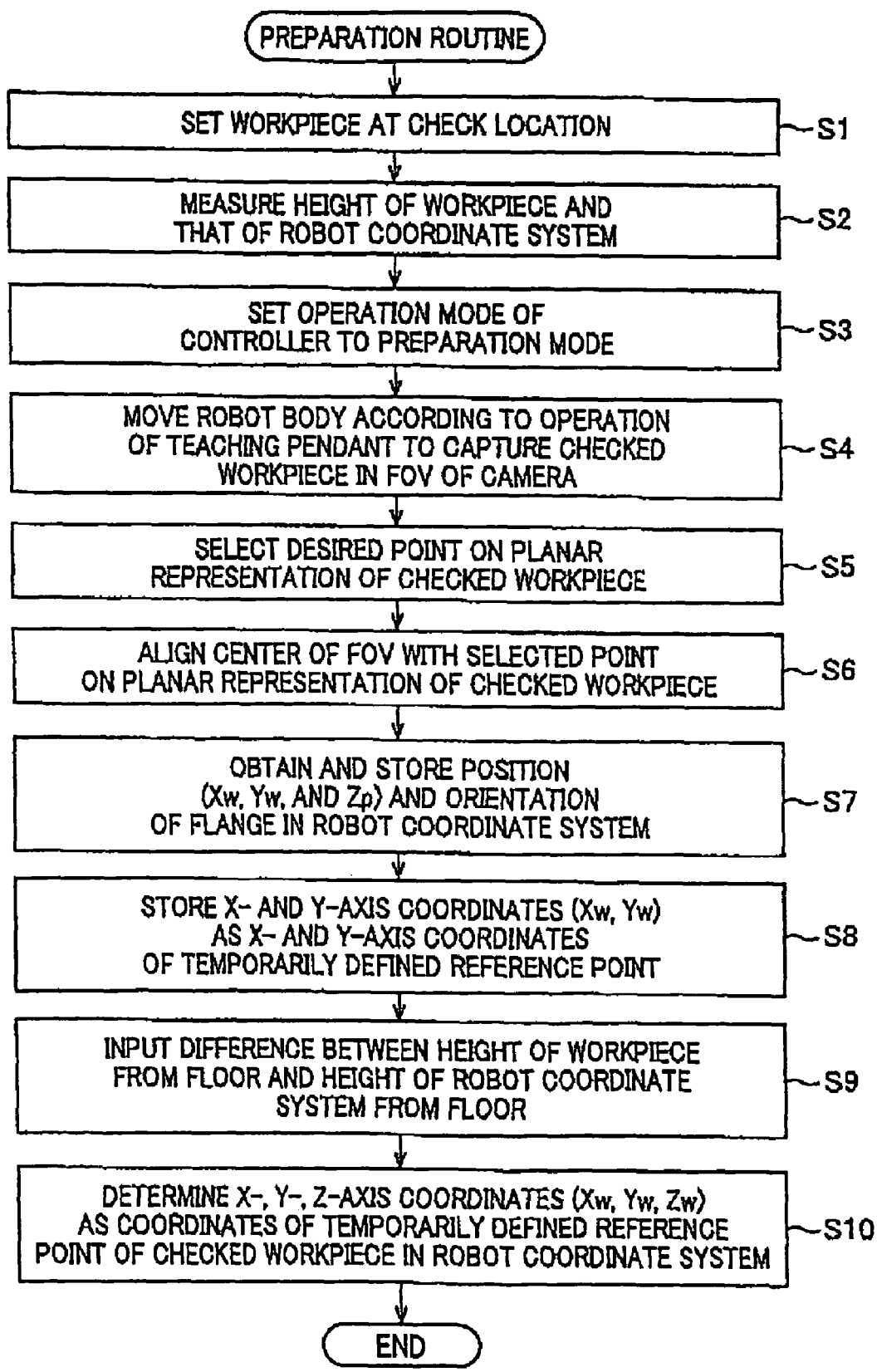
FIG. 5 is a flowchart schematically illustrating a preparation routine to be executed by a controller according to the embodiment.

When a user wants to carry out the preparation routine, the user sets an assembled workpiece 19 to be checked on the flat mount surface of the mount table T to place it at the preset check location as a checked workpiece 19 (see FIG. 4B) in step S1 of FIG. 5.

Next, the user measures the height H of a given point Q of the checked workpiece 19 from the floor F, and the height h of the origin of the robot coordinate system S from the floor F in step S2.

The given point G of the checked workpiece 19 can be set at the top of the checked workpiece 19, at the bottom of the checked workpiece 19, or at the middle of the checked workpiece 19 between the top and bottom thereof. Assuming that the camera 11 is arranged to be directed to the given point G of the checked workpiece 19 from the upper side of the checked workpiece 19 described hereinafter, the given point G is preferably set at a lower side of the checked workpiece 19, more preferably the bottom of the checked workpiece 19. This is because a longer interval between the camera 11 and the given point G allows the checked workpiece 19 to be more easily captured in the FOV of the camera 11.

After the set of the checked workpiece 19, the user operates the teaching pendant 3 to send, to the CPU 12, a mode setting instruction. Based on the mode setting instruction sent to the CPU 12, the CPU 12 sets its operation mode to a preparation mode in step S3.

In the preparation mode, the CPU 12 displays an image picked up by the camera 11 on the screen of the display 4. Next, the CPU 12 displays, at the bottom right corner of the screen of the display 4, the window W in which the respective three-dimensional graphical models 1M, DM, 19M, TM, and FM of the robot body 1, the mount D, the workpiece 19 the mount table T, and the floor F are displayed.

In the preparation mode, the CPU 12 sets the robot body 1 to be ready for movement in accordance with manipulations of the teaching pendant 3, and sets the three-dimensional graphical model 1M of the robot body 1 to be ready for movement that follows the movement of the robot body 1.

In the ready state, in accordance with instructions sent from the teaching pendant 3 by the user's operations, the CPU 12 moves the robot body 1 while changing a pose of the robot body 1, sequentially picks up an image by the camera 11, and sequentially displays the picked-up images on the screen of the display 4 in step S4 (see FIG. 4A).

While monitoring the images displayed on the screen of the display 4, the user operates the teaching pendant 3 to instruct the CPU 12 to move the robot body 1 so that the camera 11 is located above the checked workpiece 19 with at least part of the checked workpiece 19 being captured in the FOV of the camera 11 in step S4.

In step S4, while monitoring the images displayed on the screen of the display 4, the user operates the teaching pendant 3 to instruct the CPU 12 to adjust the height of the camera 11 in the Z direction and the horizontal position thereof in the X-Y plane of the robot coordinate system S. This adjustment allows the whole of the checked workpiece 19 to be captured in the FOV of the camera 11 in step S4.

Figure 6:
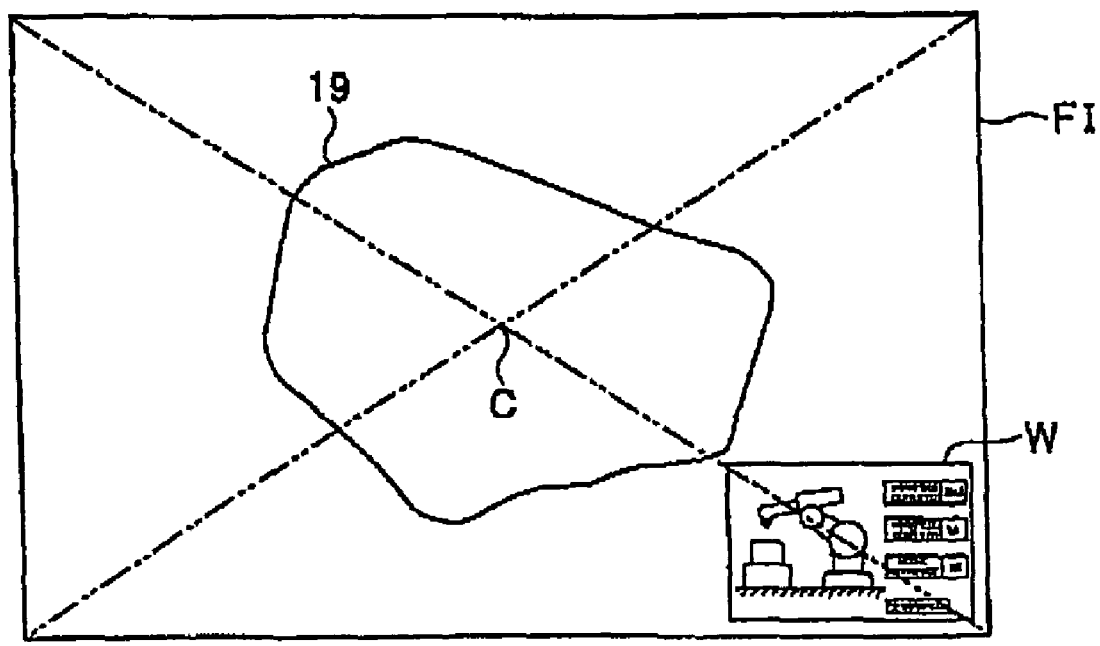
FIG. 6 is a view schematically illustrating a selected point in the planer image of the checked workpiece displayed on the screen of the display according to the embodiment.

This results in that a planar image IP of the checked workpiece 19 as being viewed from the upper side thereof appears in each of the picked-up images displayed on the screen of the display 4 (see FIG. 6).

Thereafter, the user operates the teaching pendant 3 to move the cursor to a substantial center of the planer image IP of the checked workpiece 19 as a desired point on the planer image IP, and to click the cursor on the desired point in step S5.

This instructs the CPU 12 to select a substantial center point C of a planar representation of the actual checked workpiece 19 as being viewed from the upper side thereof. This also instructs the CPU 12 to display the selected point C on the planer representation of the actual checked workpiece 19 as a dot C on the planer image IP (see FIG. 6). The selected point cannot be displayed on the planer image IP.

Next, while monitoring the planer image IP displayed on the screen of the display 4, the user operates the teaching pendant 3 to send an instruction to the CPU 12 in step S6.

The instruction causes the CPU 12 to move the robot body 1 in the X-Y plane of the robot coordinate system so that a substantial center of the FOV of the camera 11 is substantially in agreement with the selected point C on the planer representation of the actual checked workpiece 19 in step S6.

In other words, the instruction causes the CPU 12 to locate the camera 11 above the selected point C so that the optical axis of the camera 11 passes through the selected point C in step S6.

For example, it is assumed that each of the picked up images is displayed on the screen of the display 4 as illustrated in FIG. 6 by reference character "FI". In this assumption, the operation of the CPU 12 in step S6 allows the selected point C displayed on the planer image IP to be aligned with the center of each of the picked up images FI, in other words, the center of the FOV of the camera 11. Thus, the CPU 12 easily determines that the camera 11 is located above the selected point C on the planer representation of the actual checked workpiece 19.

Note that the user can actually view the positional relationship between the camera 11 and a substantial center of the checked workpiece 19 to thereby determine that the camera 11 is located above the selected point C on the planer representation of the selected workpiece 19.

After alignment between the selected point C on the planer representation of the checked workpiece 19 and the center of the FOV of the camera 11, the user operates the teaching pendant 3 to instruct the CPU 12 to:

obtain the pose (position and orientation) of the flange 10 of the robot body 1 in the robot coordinate system S for the selected point C based on information indicative of the actual rotation angle of each of the joints 5, 6, 7a, 8a, 9, and 10; and store, in the RAM 16, pose data indicative of the pose of the flange 10 of the robot body 1 in the robot coordinate system S in step S7.

In step S7, the CPU 12 obtains, as the position of the flange 10, X-axis, Y-axis, and Z-axis coordinates (Xw, Yw, and Zp) of a position in the robot coordinate system S at which the origin P0 of the three-dimensional coordinate system defined in the flange 10 occupies.

In addition, in step S7, the CPU 12 obtains, as the orientation of the flange 10, the reference vector defined by the approach vector A and the orientation vector O in the robot coordinate system S.

Then, the CPU 12 stores, as the pose data, the obtained pose (obtained position and obtained orientation) of the flange 10 of the robot body 1 in the RAM 16 in step S7.

Next, the CPU 12 stores, in the RAM 16, the X- and Y-axis coordinates Xw and Yw in the X-Y plane on the robot coordinate system S in step S8. Note that, in step S8, the CPU 12 can display the X- and Y-axis coordinates Xw and Yw in the dialog boxes DL1 and DL2, respectively (see FIG. 4B).

Subsequently, the user operates the teaching pendant 3 to input, to the CPU 12, the difference between the measured height H of the checked workpiece 19 and the measured height h of the origin of the robot coordinate system S in step S2 with the use of the three-dimensional graphical model 1M displayed in the screen of the display 4 in step S9.

Specifically, the user operates the teaching pendant 3 to enter the difference in the dialog box DL3 and click the dialog-box DL3.

The click of the dialog box DL3 instructs the controller 2 to:

read the inputted difference "H-h" in the dialog box DL3;

convert the inputted difference "H-h" into the height Zw in the Z direction of the robot coordinate system S; and store, in the RAM 16, the height Zw in the Z-direction of the robot system RS in step S9.

Thus, the CPU 12 determines the X-, Y-, and Z-axis coordinates (Xw, Yw, and Zw) stored in the RAM 16 as X-, Y-, and Z-axis coordinates of a temporarily defined reference point of the checked workpiece 19 in the robot coordinate system S in step S10, terminating the preparation routine.

After determination of the coordinate position of the temporarily defined reference point of the checked workpiece 19 in the robot coordinate system S, the user carries out determination of target pickup poses.

Specifically, a user operates the teaching pendant 3 to instruct the controller 2 to: move the robot body 1 around the checked workpiece 19 while changing a pose of the robot body 1; pick up an image by the camera 11; and display it on the display 4;

when a desired check point of the checked workpiece 19 is contained in the FOV of the camera 11 in a pose of the flange 10 so as to be displayed on the display 4, the user determines that the pose of the flange 10 as a target pickup pose. Thus, the user operates the teaching pendant 3 to instruct the controller 2 to store the target pickup pose in, for example, the RAM 16.

These operations are repeatedly carried out. When all target pickup poses corresponding to all desired check points of the checked workpiece 19 are stored in the RAM 16, the determining of the target pickup poses of the camera 11 is terminated.

During the determining routine of target pickup poses, the checked workpiece 19 may be out of the FOV of the camera 11.

In this case, the user operates the teaching pendant 3 to carry out a predetermined operation, such as clicking of the clickable icon IC displayed in the window W on the screen of the display 4. This instructs the CPU 12 of the controller 2 to set its operation mode to a reference point pickup mode.

Figure 7:
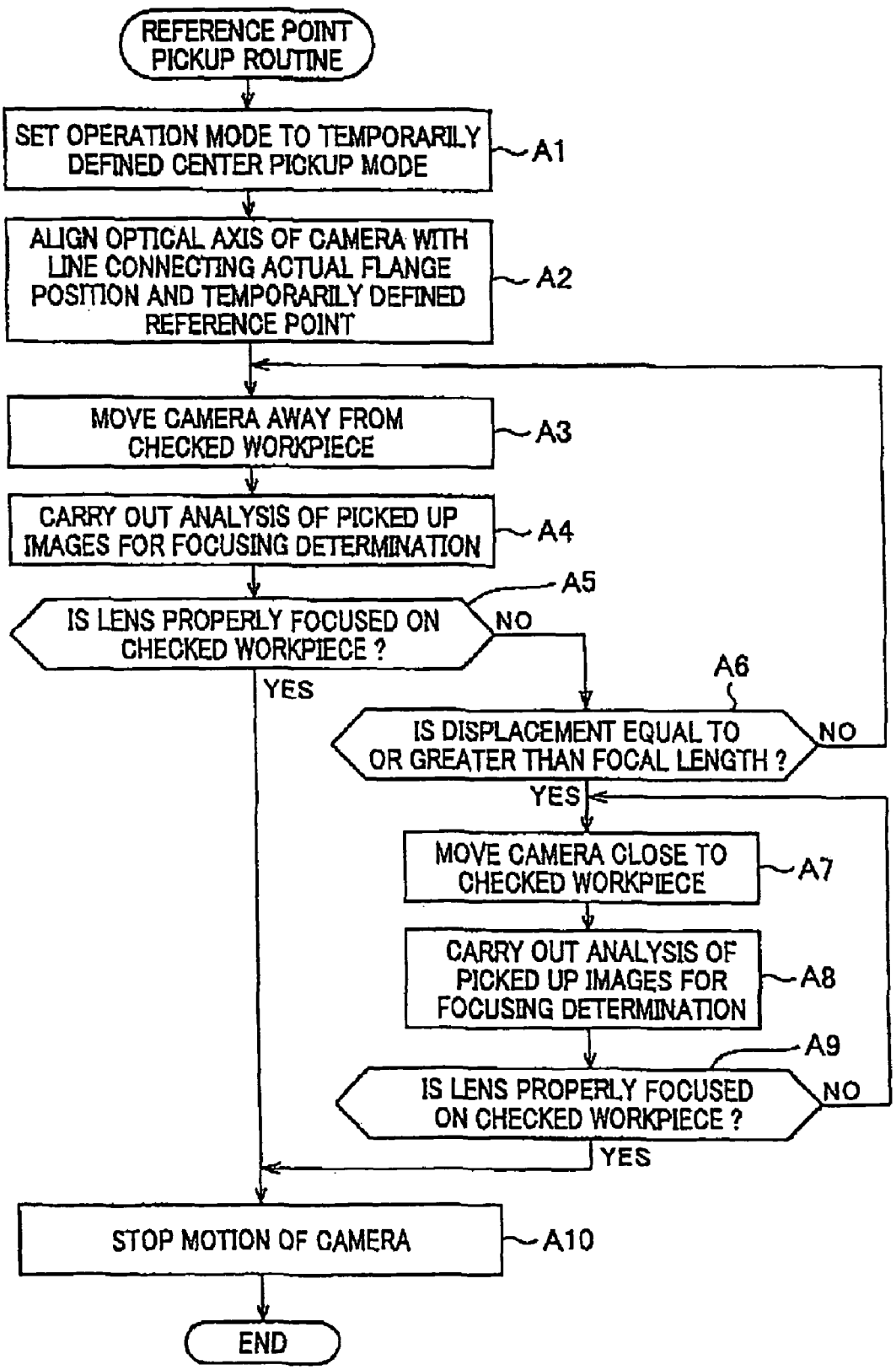
FIG. 7 is a flowchart schematically illustrating a temporal-center pickup routine to be executed by the controller according to the embodiment.
Figure 8:
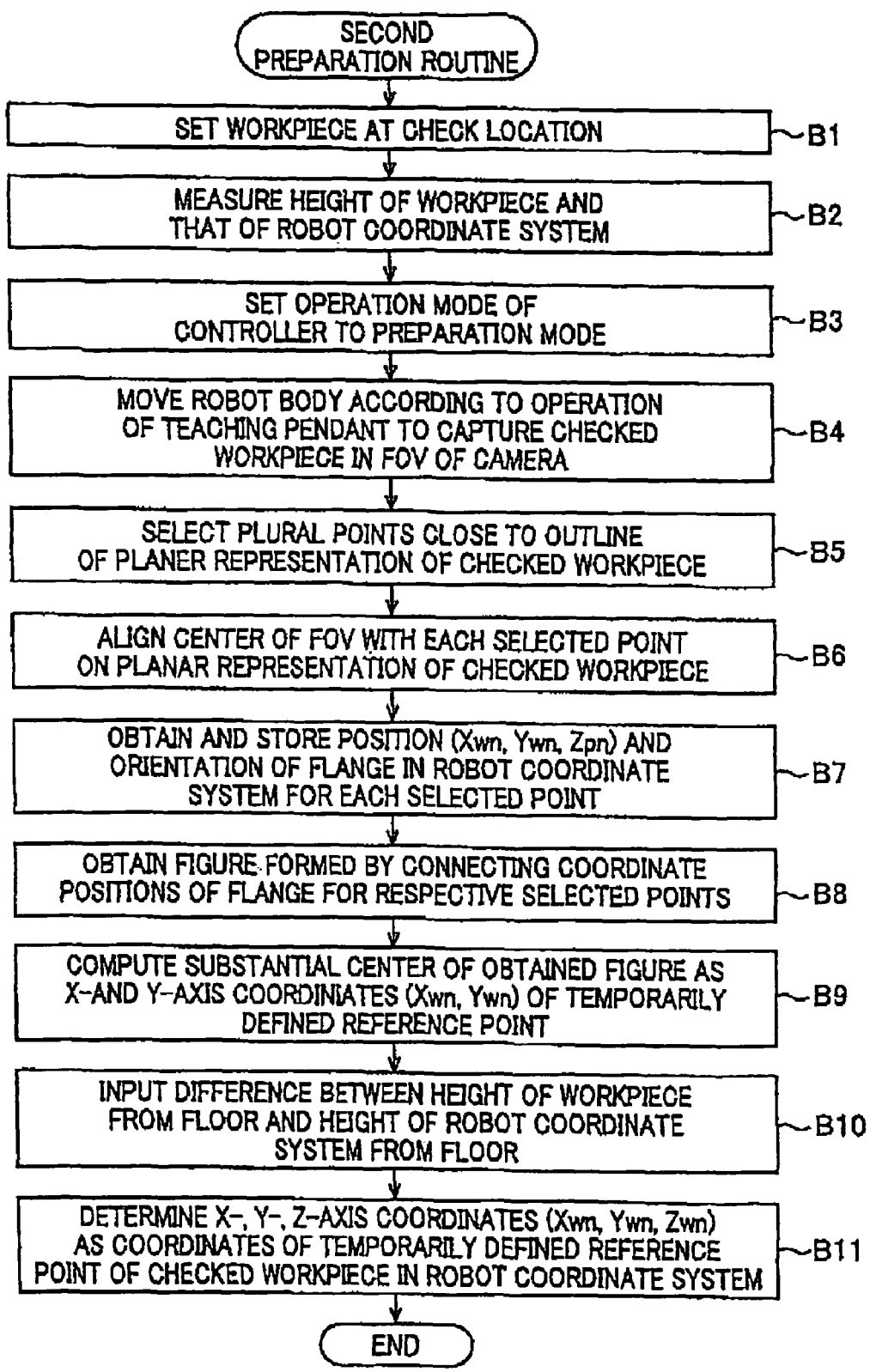
FIG. 8 is a flowchart schematically illustrating a second preparation routine to be executed by the controller according to a first modification of the embodiment.

In the reference point pickup mode, the CPU 12 executes a reference point pickup routine illustrated in FIG. 7. The reference point pickup routine controls motion of the robot body 1 to thereby correct the orientation of the optical axis of the camera 11 such that the checked workpiece 19 is captured in the FOV of the camera 11 and that the focus of the lens of the camera 11 is automatically adjusted on the checked workpiece 19.

When the CPU 12 sets its operation mode to the reference point pickup mode in step A1, the CPU 12 proceeds to step A2.

In step A2, the CPU P12 obtains, based on the information indicative of the actual rotation angle of each of the joints 5, 6, 7a, 8a, 9, and 10, an actual pose (position and orientation) of the flange 10 of the robot body 1 in the robot coordinate system S.

Next, the CPU 12 obtains the coordinate position of the temporarily defined reference point of the checked workpiece 19 from the RAM 16 in step A2. Then, in step A2, the CPU 12 drives the robot body 1 such that the optical axis of the camera 11 is aligned with a line connecting the actual position of the flange 10 and the coordinate position of the temporarily defined reference point of the checked workpiece 19.

In other words, in step A2, the CPU 12 drives the robot body 1 such that the camera 11 is directed toward the temporarily defined reference point of the checked workpiece 19.

Subsequently, the CPU 12 drives the robot body 2 such that the camera 11 moves away from the checked workpiece 19 in the optical axis in step A3.

During the movement of the camera 11 in step A3, the CPU 12 repeatedly carries out a normal analysis of the picked up images for focusing determination in step A4 to thereby determine whether the lens of the camera 11 is properly focused on the checked workpiece 11 in step A5.

During repeat execution of the operations in steps A4 and A5, upon determining that the lens of the camera 11 is properly focused on the checked workpiece 11 (YES in step A5), the CPU 12 stops the motion of the robot body 1 in step A10, terminating the reference point pickup routine.

During the movement of the camera 11 in step A3 upon the determination in step A5 being negative, the CPU 12 determines whether the displacement of the camera 11 is equal to or greater than a focal length of the lens of the camera 11 in step A6.

Upon determining that the displacement of the camera 11 is equal to or greater than the focal length of the lens of the camera 11 (YES in step A6), the CPU 12 determines that further movement of the camera 11 away from the checked workpiece 19 in the optical axis cannot make the lens of the camera 11 properly focus on the checked workpiece 19.

Thus, upon determining that the displacement of the camera 11 is equal to or greater than the focal length of the lens of the camera 11 (YES in step A6), the CPU 12 proceeds to step A7. In step A7, the CPU 12 stops the movement of the camera 11 away from the checked workpiece 19 in the optical axis, and moves the camera 11 close to the checked workpiece 19 in the optical axis.

During the movement of the camera 11 in step A7, the CPU 12 repeatedly carries out the normal analysis of the picked up images for focusing determination in step A8 to thereby determine whether the lens of the camera 11 is properly focused on the checked workpiece 11 in step A9.

During repeat execution of the operations in steps A8 and A9, upon determining that the lens of the camera 11 is properly focused on the checked workpiece 11 (YES in step A9), the CPU 12 stops the motion of the robot body 1 in step A10, terminating the reference point pickup routine.

The completion of the reference point pickup routine allows the checked workpiece 19 to be recaptured in the FOV of the camera 11. Then, the CPU 12 returns to the determining routine of target pickup poses.

Specifically, even if the checked workpiece 19 is out of the FOV of the camera 11 during execution of the determining routine of target pickup poses, a user merely clicks the clickable icon IC to thereby instruct the CPU 12 of the controller 2 to set its operation mode to the reference point pickup mode. This allows the checked workpiece 19 to be recaptured in the FOV of the camera 11.

Accordingly, it is possible to easily recapture the checked workpiece 19 in the FOV of the camera 11 with a little time and effort of a user even though the checked workpiece 19 is out of the FOV of the camera 11.

The preparation routine according to the embodiment is configured to determine one temporarily defined reference point of the checked workpiece 19 in order to address situations where the checked workpiece 19 is out of the FOV of the camera 11. The preparation routine set forth above will be also referred to as "first preparation routine" hereinafter.

As first, second, and third modifications of the embodiment, the following second, third, and fourth preparation routines other than the first preparation routine can be used to address situations where the checked workpiece 19 is out of the FOV of the camera 11.

Next, the second preparation routine and manual operations associated therewith according to the first modification of the embodiment will be described hereinafter with reference to FIGS. 8 and 9A to 9C. The second preparation routine is configured to:

obtain a plurality of desired positions of the flange 10 over the checked workpiece 19 in the robot coordinate system S; and determine, as a temporarily defined reference point of the checked workpiece 19, a substantial center of a figure formed by connecting the plurality of desired positions of the flange 10.

Specifically, when a user wants to carry out the second preparation routine, the user and/or the CPU 12 carry out the operations in steps B1 to B4 that, are identical to those in steps S1 to S4 of FIG. 5.

Figure 9A:
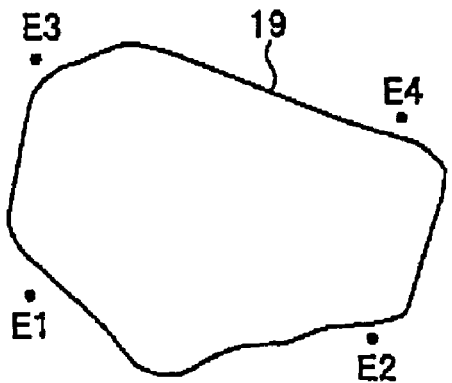
FIG. 9A is a view schematically illustrating one example of a plurality of specified points close to an outline of the planer image displayed on the screen of the display according to the first modification.

Thereafter, the user operates the teaching pendant 3 to move the cursor to a plurality of points close to the outline of the planer image IP, such as four points E1, E2, E3, and E4 illustrated in FIG. 9A, and to click the cursor on each of the specified points E1 to E4 in step B5.

This instructs the CPU 12 to select four points E1 to E4 close to the outline of a planar representation of the actual checked workpiece 19 as being viewed from the upper side thereof. This also instructs the CPU 12 to display the selected four points E1 to E4 close to the outline of the planer representation of the actual checked workpiece 19 as dots E1 to E4 on the screen of the display 4 (see FIG. 9A). Note that the specified points E1 and E2 are closer to the robot body 1 than the specified points E3 and E4.

Next, while monitoring the planer image IP displayed on the screen of the display 4, the user operates the teaching pendant 3 to instruct the CPU 12 to move the robot body 1 in the X-Y plane of the robot coordinate system S so that the substantial center of the FOV of the camera 11 is substantially in agreement with each of the points E1 to E4 in step B6.

After alignment between each of the selected points E1 to E4 and the center of the FOV of the camera 11, the user operates the teaching pendant 3 to instruct the CPU 12 to:

obtain the pose (position and orientation) of the flange 10 of the robot body 1 in the robot coordinate system S for each of the selected points E1 to E4 based on information indicative of the actual rotation angle and actual angular velocity of each of the joints 5, 6, 7a, 8a, 9, and 10; and store, in the RAM 16, pose data indicative of the pose of the flange 10 of the robot body 1 in the robot coordinate system S for each of the selected points E1 to E4 in step B7.

Specifically, in step B7, the CPU 12 obtains, as the position of the flange 10 for each of the selected points E1 to E4, X-axis, Y-axis, and Z-axis coordinates (Xwn, Ywn, and Zpn) of a position in the robot coordinate system S at which the origin P0 of the three-dimensional coordinate system defined in the flange 10 occupies.

In addition, in step B7, the CPU 12 obtains, as the orientation of the flange 10 for each of the selected points E1 to E4, the reference vector defined by the approach vector A and the orientation vector O in the robot coordinate system S.

Then, the CPU 12 stores, as the pose data, the obtained pose (obtained position and obtained orientation) of the flange 10 of the robot body 1 for each of the selected points E1 to E4 in the RAM 16 in step B7.

Next, the CPU 12 obtains a figure formed by connecting the coordinate positions of the flange 10 for the respective selected points E1 to E4 in step B8. Then, the CPU 12 computes a substantial center of the obtained figure, and sets X- and Y-axis coordinates of the computed center of the obtained figure in the X-Y plane on the robot coordinate system S as X-, and Y-axis coordinates (Xwn, Ywn) of the temporarily defined reference point of the checked workpiece 19 in step B9.

For example, in step B9, the CPU 12 sets a vertical line on the obtained figure; this vertical line horizontally divides the obtained figure in two parts each with the same area, and sets a horizontal line on the obtained figure; this horizontal line vertically divides the obtained figure in two parts each with the same area. The CPU 12 determines a point of intersections of the vertical and horizontal lines as the substantial center of the obtained figure.

The user and the CPU 12 carry out the operations in step B10 equivalent to those in step S9 so that a height Zwn in the Z-direction of the robot coordinate system S is stored in the RAM 16.

Thus, the CPU 12 determines the X-, Y-, and Z-axis coordinates (Xwn, Ywn, and Zwn) stored in the RAM 16 as X-, Y-, and Z-axis coordinates of the temporarily defined reference point of the checked workpiece 19 in the robot coordinate system S in step B11, terminating the second preparation routine.

Figure 9B:
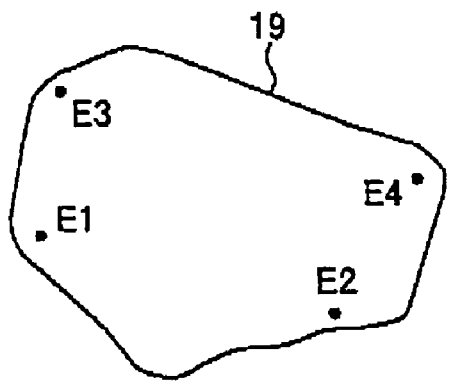
FIG. 9B is a view schematically illustrating another example of a plurality of specified points close to the outline of the planer image displayed on the screen of the display according to the first modification.
Figure 9C:
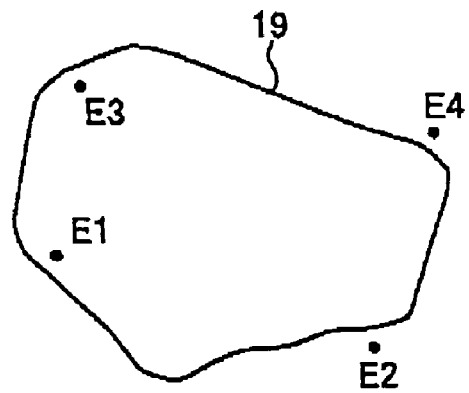
FIG. 9C is a view schematically illustrating a further example of a plurality of specified points close to the outline of the planer image displayed on the screen of the display according to the first modification.

Note that, as illustrated in FIG. 9A, the four points E1, E2, E3, and E4 are located out of the outline of the planer image IP, but they can be located within the outline thereof (see FIG. 9B). Otherwise, some of the four points E1, E2, E3, and E4 can be located out of the outline of the planer image IP, and the remaining points can be located within the outline thereof (see FIG. 9C).

Next, the third preparation routine and manual operations associated therewith according to the second modification of the embodiment will be described hereinafter with reference to FIGS. 10 to 13. The third preparation routine is configured to select a plurality of partially center points of a planer representation of the actual checked workpiece 19. The third preparation routine can be preferably applied to large-sized works and works each with different shaped portions.

Specifically, when a user wants to carry out the third preparation routine, the user and/or the CPU 12 carry out the operations in steps C1 to C4 that are identical to those in steps S1 to S4 in FIG. 5.

Figure 10:
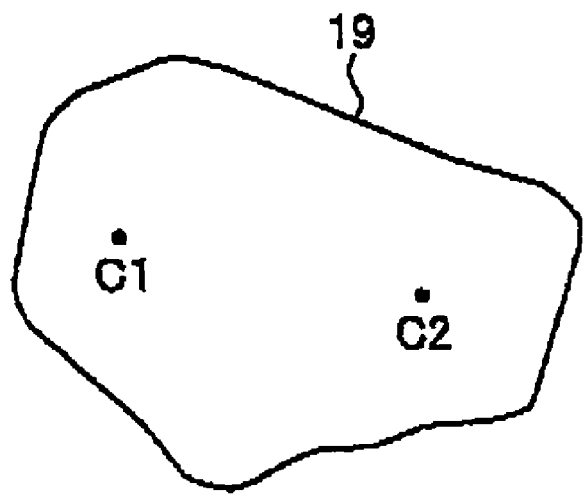
FIG. 10 is a view schematically illustrating a planer image of a checked workpiece having one shape on which two selected points are represented according to a second modification of the embodiment.
Figure 11:
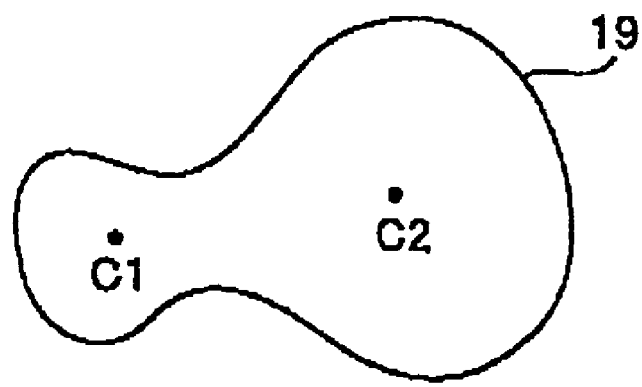
FIG. 11 is a view schematically illustrating a planer image of a checked workpiece having another shape on which two selected points are represented according to the second modification of the embodiment.
Figure 12:
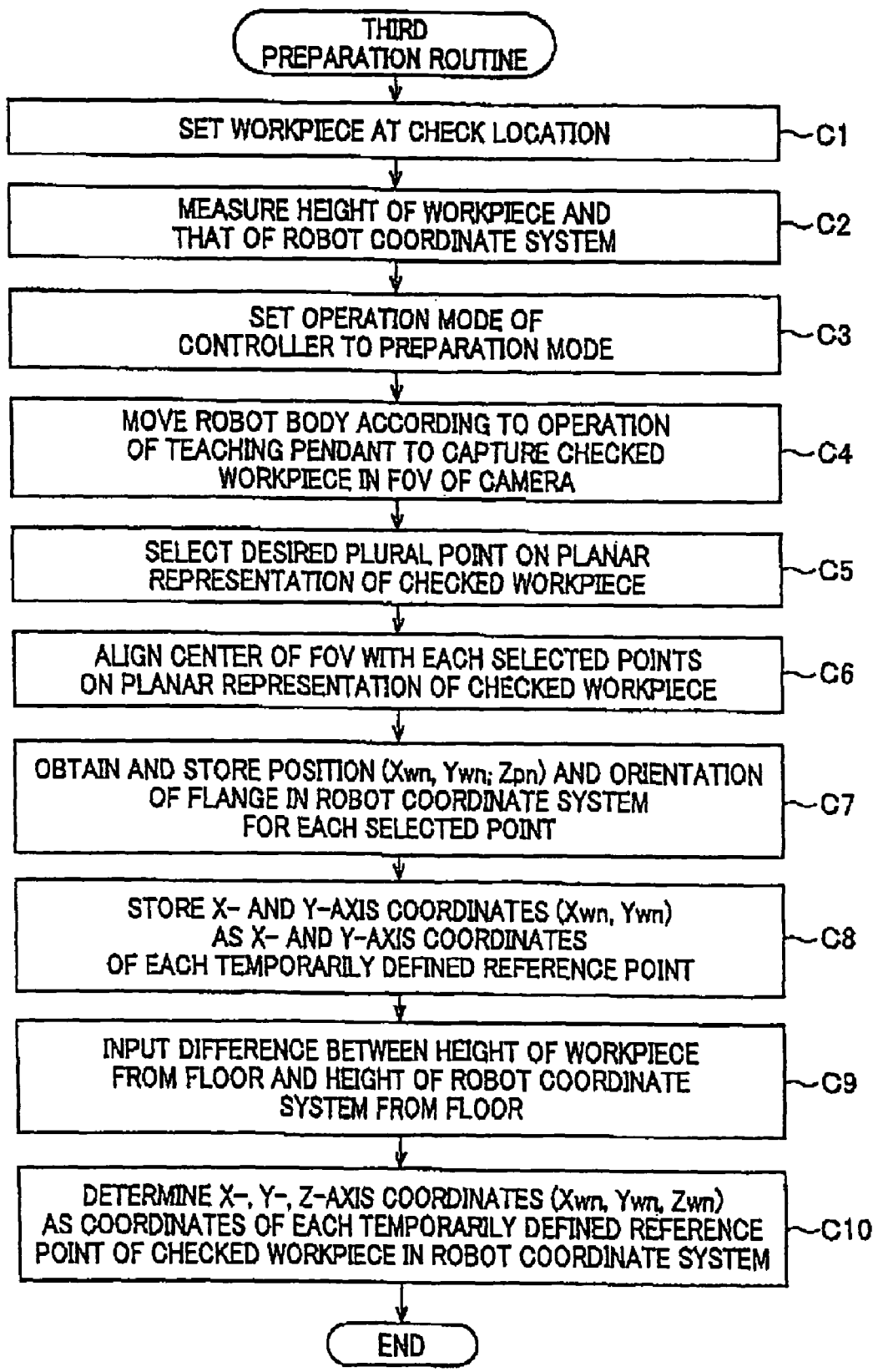
FIG. 12 is a flowchart schematically illustrating a third preparation routine to be executed by the controller according to the second modification of the embodiment.

Thereafter, the user operates the teaching pendant 3 to move the cursor to a plurality of desired points on the planer image IP, such as two points C1 and C2 illustrated in FIG. 10 or FIG. 11, and to click the cursor on each of the specified points C1 and C2.

This instructs the CPU 12 to select two points C1 and C2 on a planar representation of the actual checked workpiece 19 as being viewed from the upper side thereof. This also instructs the CPU 12 to display the selected two points C1 and C2 on the planer representation of the actual checked workpiece 19 as dots C1 and C2 on the screen of the display 4 (see FIG. 10 or 11).

Next, while monitoring the planer image IP displayed on the screen of the display 4, the user operates the teaching pendant 3 to instruct the CPU 12 to move the robot body 1 in the X-Y plane of the robot coordinate system so that the substantial center of the FOV of the camera 11 is substantially in agreement with each of the points C1 and C2 on the planer representation of the actual checked workpiece 19 in step C6.

After alignment between each of the selected points C1 and C2 on the planer representation of the checked workpiece 19 and the center of the FOV of the camera 11, the user operates the teaching pendant 3 to instruct the CPU 12 to:

obtain the pose (position and orientation) of the flange 10 of the robot body 1 in the robot coordinate system S for each of the selected points C1 and C2 based on information indicative of the actual rotation angle and actual angular velocity of each of the joints 5, 6, 7a, 8a, 9, and 10; and store, in the RAM 16, pose data indicative of the pose of the flange 10 of the robot body 1 in the robot coordinate system S for each of the selected points C1 and C2 in step C7.

Specifically, in step C7, the CPU 12 obtains, as the position of the flange 10 for each of the selected points C1 and C2, X-axis, Y-axis, and Z-axis coordinates (Xwn, Ywn, and Zpn) of a position in the robot coordinate system S at which the origin P0 of the three-dimensional coordinate system defined in the flange 10 occupies.

In addition, in step C7, the CPU 12 obtains, as the orientation of the flange 10 for each of the selected points C1 and C2, the reference vector defined by the approach vector A and the orientation vector O in the robot coordinate system S.

Then, the CPU 12 stores, as the pose data, the obtained pose (obtained position and obtained orientation) of the flange 10 of the robot body 1 for each of the selected points C1 and C2 in the RAM 16 in step C7.

Next, the CPU 12 obtains, as the position of the flange 10 for the selected points C1 and C2, X-axis, Y-axis, and Z-axis coordinates (Xwn, Ywn, and Zpn) of a position in the robot coordinate system S at which the origin P0 of the three-dimensional coordinate system defined in the flange 10 occupies.

The user and the CPU 12 carry out the operations in step C9 equivalent to those in step S9 so that a height Zwn in the Z-direction of the robot system RS is stored in the RAM 16.

Thus, the CPU 12 determines the X-, Y-, and Z-axis coordinates (Xwn, Ywn, and Zwn) for each of the selected points C1 and C2 stored in the RAM 16 as X-, Y-, and Z-axis coordinates of a corresponding one of the temporarily defined reference points of the checked workpiece 19 in the robot coordinate system S in step B10, terminating the third preparation routine.

After determination of the coordinate position of each of the temporarily defined reference points of the checked workpiece 19 in the robot coordinate system S, the user carries out the determining routine of target pickup poses set forth above.

During the determining routine of target pickup poses, the checked workpiece 19 may be out of the FOV of the camera 11.

In this case, the user operates the teaching pendant 3 to click the clickable icon IC displayed in the window W on the screen of the display 4. This instructs the CPU 12 of the controller 2 to sets its operation mode to a reference point pickup mode.

Figure 13:
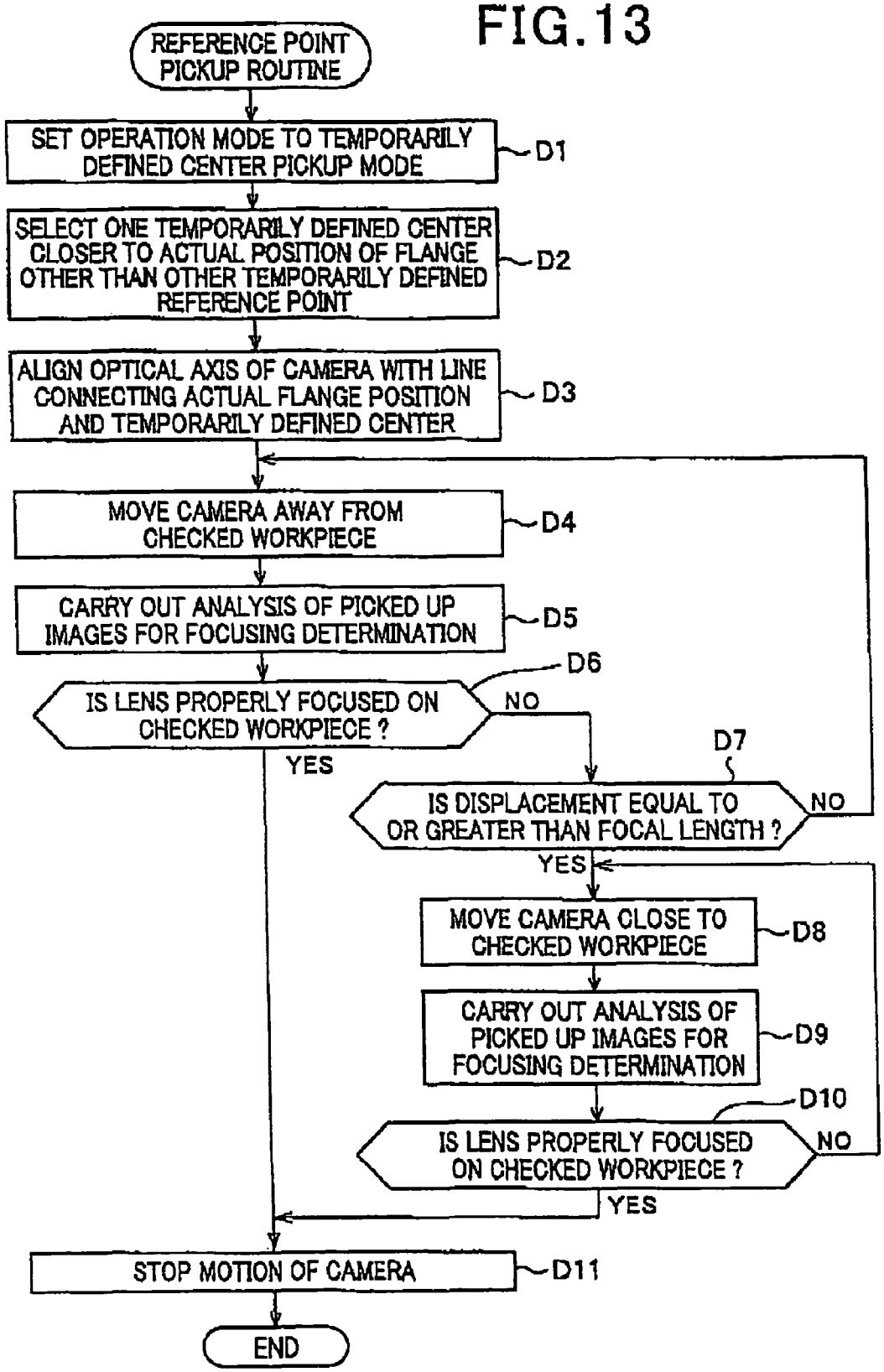
FIG. 13 is a flowchart schematically illustrating a reference point pickup routine after to be executed by the controller according to the second modification of the embodiment.

In the reference point pickup mode, the CPU 12 executes a reference point pickup routine illustrated in FIG. 13.

When the CPU 12 sets its operation mode to the reference point pickup mode in step D1, the CPU 12 proceeds to step D2.

In step D2, the CPU 12 obtains, based on the information indicative of the actual rotation angle of each of the joints 5, 6, 7a, 8a, 9, and 10, an actual pose (position and orientation) of the flange 10 of the robot body 1 in the robot coordinate system S.

Next, in step D2, the CPU 12 selects one of the temporarily defined reference points of the checked workpiece 19; this one of the temporarily defined referenced points of the checked workpiece 19 is closer to the actual position of the flange 10 of the robot body 1 than the other thereof.

Then, in step D3, the CPU 12 obtains the coordinate position of the selected one of the temporarily defined reference points of the checked workpiece 19 from the RAM 16. In step D3, the CPU 12 drives the robot body 1 such that the optical axis of the camera 11 is aligned with a line connecting the actual position of the flange 10 and the coordinate position of the selected one of the temporarily defined reference points of the checked workpiece 19.

Thereafter, the CPU 12 carries but the operations in steps D4 to D11 corresponding to those in steps A3 to A10 in FIG. 7.

The completion of the temporarily defined reference point pickup routine allows the checked workpiece 19 to be recaptured in the FOV of the camera 11. Then, the CPU 12 returns to the determining routine of target pickup poses.

Specifically, even if the checked workpiece 19 is out of the FOV of the camera 11 during execution of the determining routine of target pickup poses, a user merely clicks the clickable icon IC to thereby instruct the CPU 12 of the controller 2 to set its operation mode to the reference point pickup mode. This allows the checked workpiece 19 to be recaptured in the FOV of the camera 11.

Accordingly, it is possible to easily recapture the checked workpiece 19 in the FOV of the camera 11 with a little time and effort of a user even though the checked workpiece 19 is out of the FOV of the camera 11.

In addition, when the checked workpiece 19 is out of the FOV of the camera 11, the CPU 12 and the operator move the robot body 1 toward one of the temporarily defined reference points of the checked workpiece 19 closer to the actual position of the flange 10 of the robot body 1 than the other thereof.

This makes it possible to reduce the displacement of the robot body 1 for recapturing the checked workpiece 19 in the FOV of the camera 11.

Figure 14:
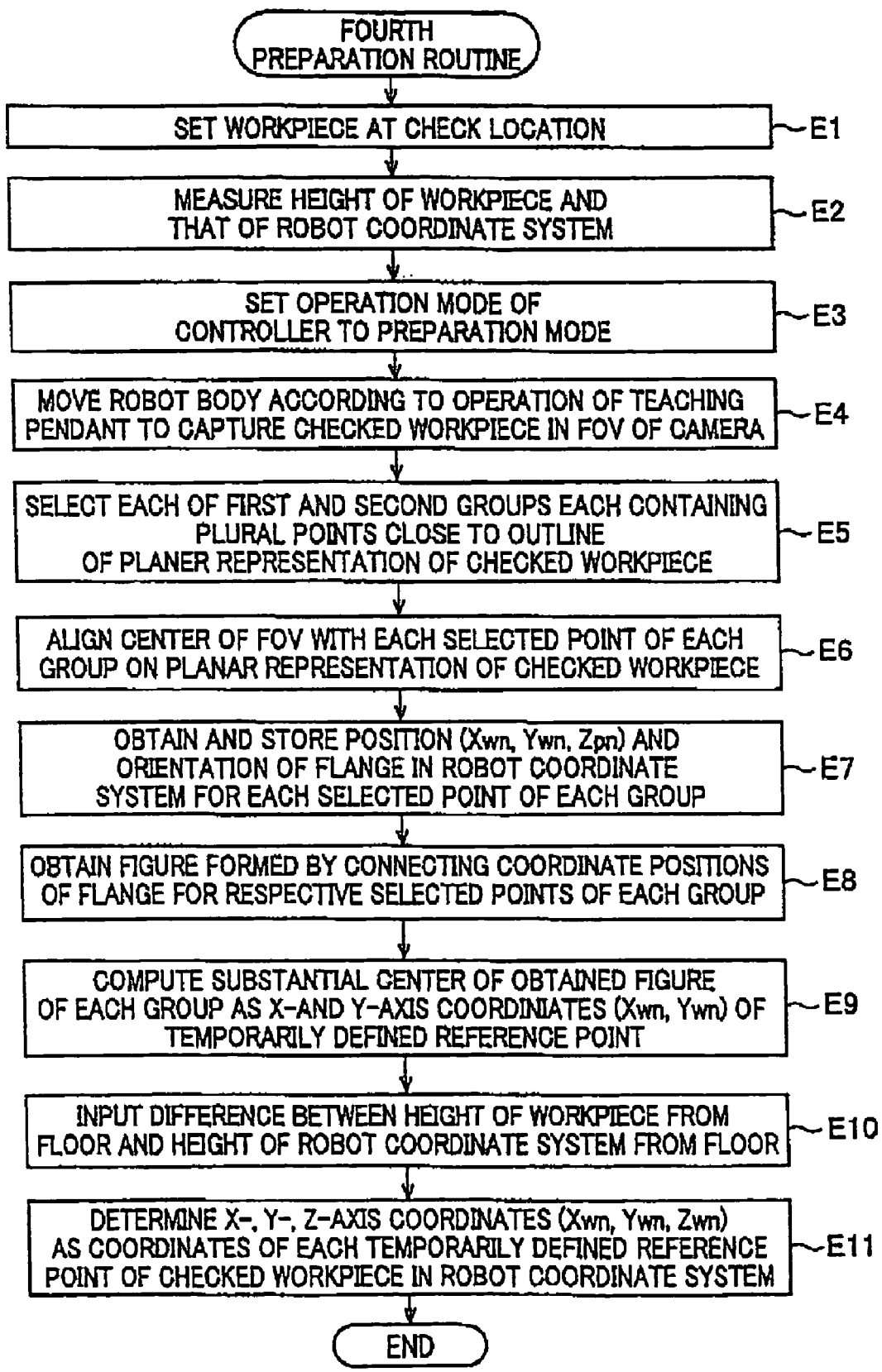
FIG. 14 is a flowchart schematically illustrating a fourth preparation routine to be executed by the controller according to a third modification of the embodiment.

Next, the fourth preparation routine and manual operations associated therewith according to the third modification of the embodiment will be described hereinafter with reference to FIGS. 14 and 15. The third preparation routine is configured to select a plurality of partially center points of a planer representation of the actual checked workpiece 19; each of the plurality of partially center points is a substantial center of a figure formed by connecting a plurality of desired positions of the flange 10.

Specifically, when a user wants to carry out the fourth preparation routine, the user and/or the CPU 12 carry out the operations in steps E1 to E4 that are identical to those in steps S1 to S4 in FIG. 5.

Figure 15:
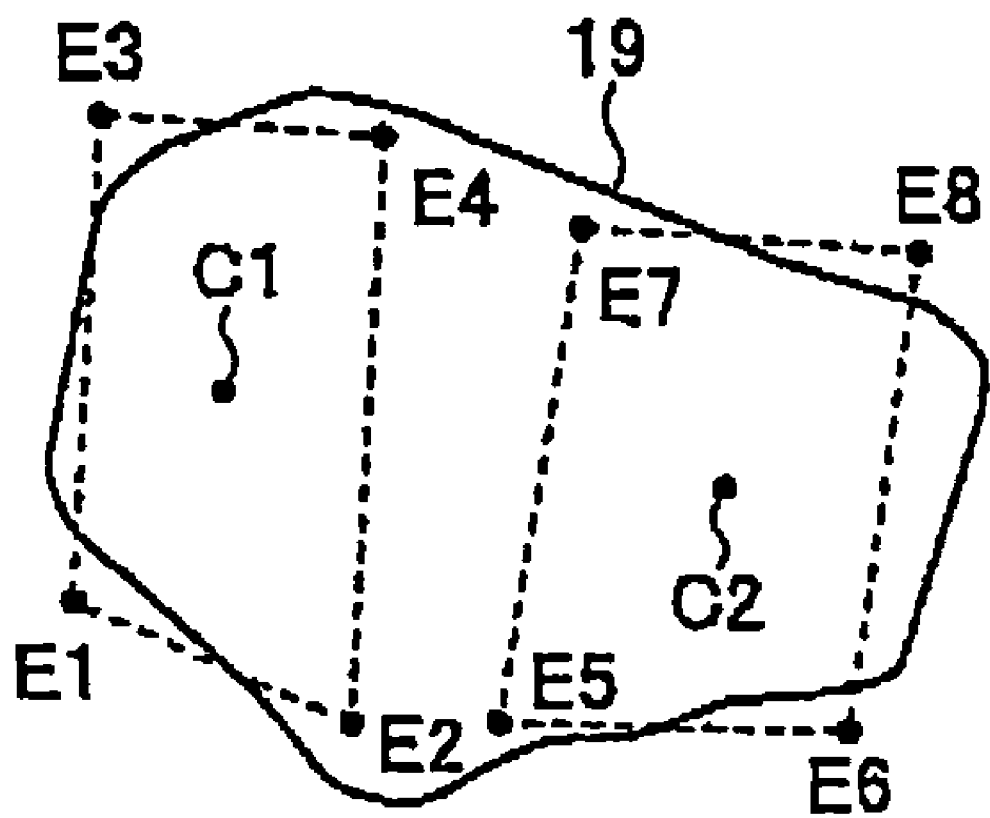
FIG. 15 is a view schematically illustrating a planer image of a checked workpiece on which a plurality of selected points are represented according to the third modification of the embodiment.

Thereafter, the user operates the teaching pendant 3 to move the cursor to a plurality of points close to the outline of the planer image IP, such as eight points E1 to E8 illustrated in FIG. 15. Note that the specified points E1, E2, E5, and E5 are closer to the robot body 1 than the specified points E3, E4, E7, and B8.

The user also operates the teaching pendant 3 to click the cursor on each of the specified points E1, E2, E3, and E4; these specified points E1 to E4 constitute a first group.

This instructs the CPU 12 to select a first group of four points E1 to E4 close to the outline of a planar representation of the actual checked workpiece 19 as being viewed from the upper side thereof. This also instructs the CPU 12 to display the selected four points E1 to E4 of the first group as dots E1 to E4 on the screen of the display 4 in step E5 (see FIG. 15).

In addition, the user operates the teaching pendant 3 to click the cursor on each of the specified points E5, E6, E7, and E8; these specified points E5 to E8 constitute a second group.

This instructs the CPU 12 to select a second group of four points E5 to E8 close to the outline of the planar representation of the actual checked workpiece 19 as being viewed from the upper side thereof. This also instructs the CPU 12 to display the selected four points E5 to E8 of the second group as dots E5 to E8 on the screen of the display 4 in step E5 (see FIG. 15).

Next, while monitoring the planer image IP displayed on the screen of the display 4, the user operates the teaching pendant 3 to instruct the CPU 12 to move the robot body 1 in the X-Y plane of the robot coordinate system so that the substantial center of the FOV of the camera 11 is substantially in agreement with each of the points E1 to E4 of the first group and each of the points E5 to E5 of the second group in step E5.

After alignment between each of the selected points E1 to E8 of the first and second groups and the center of the FOV of the camera 11, the user operates the teaching pendant 3 to instruct the CPU 12 to:

obtain the pose (position and orientation) of the flange 10 of the robot body 1 in the robot coordinate system S for each of the selected points E1 to E8 of the first and second groups based on information indicative of the actual rotation angle and actual angular velocity of each of the joints 5, 6, 7a, 8a, 9, and 10; and store, in the RAM 16, pose data indicative of the pose of the flange 10 of the robot body 1 in the robot coordinate system S for each of the selected points E1 to E8 of the first and second groups in step E7.

Specifically, in step E7, the CPU 12 obtains, as the position of the flange 10 for each of the selected points E1 to E8 of the first and second groups, X-axis, Y-axis, and Z-axis coordinates (Xwn, Ywn, and Zpn) of a position in the robot coordinate system S at which the origin P0 of the three-dimensional coordinate system defined in the flange 10 occupies.

In addition, in step E7, the CPU 12 obtains, as the orientation of the flange 10 for each of the selected points E1 to E8 of the first and second groups, the reference vector defined by the approach vector A and the orientation vector O in the robot coordinate system S.

Then, the CPU 12 stores, as the pose data, the obtained pose (obtained position and obtained orientation) of the flange 10 of the robot body 1 for each of the selected points E1 to E8 of the first and second groups in the RAM 16 in step E7.

Next, the CPU 12 obtains a first figure formed by connecting the coordinate positions of the flange 10 for the respective selected points E1 to E4 of the first group, and a second figure formed by connecting the coordinate positions of the flange 10 for the respective selected points E5 to E8 of the second group in step E8. Then, the CPU 12 computes a first substantial center of the obtained first figure, and a second substantial center of the obtained second figure in step E8.

Thereafter, the CPU 12 sets X- and Y-axis coordinates of the first substantial center of the obtained first figure in the X-Y plane on the robot coordinate system S as X-, and Y-axis coordinates (Xon1, Yon1) of the first temporarily defined reference point of the checked workpiece 19 in step E9.

Similarly, the CPU 12 sets X- and Y-axis coordinates of the second substantial center of the obtained second figure in the X-Y plane on the robot coordinate system S as X-, and Y-axis coordinates (Xon2, Yon2) of the second temporarily defined reference point of the checked workpiece 19 in step E9.

The user and the CPU 12 carry out the operations in step E10 equivalent to those in step S9 so that a height Zon in the Z-direction of the robot system RS is stored in the RAM 16.

Thus, the CPU 12 determines the X-, Y-, and Z-axis coordinates (Xon1, Yon1, and Zon) stored in the RAM 16 as X-, Y-, and Z-axis coordinates of the first temporarily defined reference point of the checked workpiece 19 in the robot coordinate system S in step E11. Similarly, the CPU 12 determines the X-, Y-, and Z-axis coordinates (Xon2, Yon2, and Zon) stored in the RAM 16 as X-, Y-, and Z-axis coordinates of the second temporarily defined reference point of the checked workpiece 19 in the robot coordinate system S in step E11. Thereafter, the CPU 12 terminates the fourth preparation routine.

After determination of the coordinate position of each of the temporarily defined reference points of the checked workpiece 19 in the robot coordinate system S, the user carries out the determining routine of target pickup poses set forth above.

During the determining routine of target pickup poses, the checked workpiece 19 may be out of the FOV of the camera 11.

In this case, the user operates the teaching pendant 3 to click the clickable icon IC displayed in the window W on the screen of the display 4. This instructs the CPU 12 of the controller 2 to sets its operation mode to the temporarily defined center pickup mode.

In the temporarily defined center pickup mode, the CPU 12 executes the reference point pickup routine illustrated in FIG. 13 set forth above.

In the fourth preparation routine, when the checked workpiece 19 is out of the FOV of the camera 11, the CPU 12 and the operator move the robot body 1 toward one of the first and second temporarily defined reference points of the checked workpiece 19 closer to the actual position of the flange 10 of the robot body 1 than the other thereof.

This makes it possible to reduce the displacement of the robot body 1 for recapturing the checked workpiece 19 in the FOV of the camera 11.

The camera 11 can be attached to the tip end surface of the flange 10 such that the optical axis L of the lens of the camera 11 can be misaligned with one coordinate axis defined in the flange 10. In this modification, the camera 11 can be attached to the tip end surface of the flange 10 such that the optical axis L of the lens of the camera 11 is:

orthogonal to one coordinate axis defined in the flange 10;
parallel to one coordinate axis defined in the flange 10; or
inclined with one coordinate axis defined in the flange 10.

When information indicative of the positional relationship between the optical axis of the camera 11 and one coordinate axis of the flange 10 has been stored in, for example, the RAM 16 of the controller 2, the CPU 2 substantially directs the camera 11 toward a temporarily defined reference point of the checked workpiece 19 such that the checked workpiece 19 is at least partly captured in the FOV of the camera 11.

In the fourth preparation routine, the number of temporarily defined reference points of the checked workpiece 19 can be set to be greater than 2.

The camera 2 can be designed as a camera with an autofocus lens mechanism or as a camera with a plurality of lenses that have different focal lengths.

The present invention can be applied to various robot systems, such as an assembly robot system or a coating robot system.

The present invention can be applied to various shapes and structures of robots without limiting such a vertical articulated robot.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. An apparatus for determining, in a three-dimensional coordinate system, a pickup pose of a robot arm with a camera when an image of a workpiece is to be picked up by the camera, the workpiece being mounted on a reference plane, the apparatus comprising:

an input unit configured to input a first coordinate of the workpiece in a first axis of the three-dimensional coordinate system, the first axis being defined as orthogonal to the reference plane;

a coordinate obtaining unit configured to:

drive the robot to move the camera opposing the workplace in the first direction such that at least part of the workplace is captured in a field of view of the camera; and obtain second and third coordinates of a preset point of the robot arm in respective second and third axes of the three-dimensional coordinate system with the at least part of the workpiece being captured in the field of view of the camera, the second and third axes being orthogonal to the first axis, the first, second, and third coordinates being defined as coordinates of a temporally defined reference point of the work piece in the three-dimensional coordinate system, the coordinate obtaining unit comprising:

a first driving unit configured to drive the robot to move the camera opposing the workpiece in the first direction such that the at least part of the workpiece is captured in the field of view of the camera;

a specifying unit configured to specify a desired point on the workpiece as the temporally defined reference point;

a second driving unit configured to drive the robot to move the camera such that the optical axis of the camera passes through the specified point; and an obtaining unit configured to obtain the second and third coordinates of the preset point of the robot arm in the respective second and third axes of the three-dimensional coordinate system with the optical axis of the camera passing through the specified point; and a pose determining unit configured to drive, at a given timing, the robot arm to determine a pose of the preset point of the robot arm based on a positional relationship between the first, second, and third coordinates of the temporally defined reference point of the workpiece and actual coordinates of the preset point of the robot arm, wherein the specifying unit is configured to:

pick up and display an image of the workpiece with the at least part of the workpiece being captured in the field of view of the camera; and specify a dot on the displayed image of the workpiece, the specified dot corresponding to the specified point on the workpiece as the temporally defined reference point.

2. The apparatus according to claim 1, wherein the pose determining unit is configured to drive, at a given timing, the robot arm to determine the pose of the preset point of the robot arm based on the positional relationship between the first, second, and third coordinates of the temporally defined reference point of the workpiece and actual coordinates of the preset point of the robot arm such that an optical axis of the camera is directed to the temporally defined reference point of the workpiece.

3. The apparatus according to claim 1, wherein the specified dot is arranged at a substantial center of the displayed image of the workpiece.

4. An. apparatus for determining, in a three-dimensional coordinate system, a pickup pose of a robot arm with a camera when an image of a workpiece is to be picked up by the camera, the workpiece being mounted on a reference plane, the apparatus comprising:

an input unit configured to input a first coordinate of the workpiece in a first axis of the three-dimensional coordinate system, the first axis being defined as orthogonal to the reference plane;

a coordinate obtaining unit configured to:

drive the robot to move the camera opposing the workpiece in the first direction such that at least part of the workpiece is captured in a field of view of the camera; and obtain second and third coordinates of a preset point of the robot arm in respective second and third axes of the three-dimensional coordinate system with the at least part of the workpiece being captured in the field of view of the camera, the second and third axes being orthogonal to the first axis, the first, second, and third coordinates being defined as coordinates of a temporally defined reference point of the workpiece in the three-dimensional coordinate system, the coordinate obtaining unit comprising a first driving unit configured to drive the robot to move the camera opposing the workpiece in the first direction such that the at least part of the workpiece is captured in the field of view of the camera;

a specifying unit configured to specify a plurality of desired points on the workpiece; and a second driving unit configured to drive the robot to move the camera such that the optical axis of the camera passes through each of the plurality of specified points; and an obtaining unit configured to:

obtain coordinates of the preset point of the robot arm in the respective second and third axes of the three-dimensional coordinate system with the optical axis of the camera passing through each of the plurality of specified points; and determine, as the second and third coordinates of the preset point of the robot arm, coordinates of a center of a figure, the figure being formed by connecting the coordinates of the preset point of the robot arm for the respective specified points; and a pose determining unit configured to drive, at a given timing, the robot arm to determine a pose of the preset point of the robot arm based on a positional relationship between the first, second, and third coordinates of the temporally defined reference point of the workpiece and actual coordinates of the preset point of the robot arm, wherein:

the specifying unit is configured to:

pick up and display an image of the workpiece with the at least part of the workpiece being captured in the field of view of the camera; and specify a plurality of dots on or around the displayed image of the workpiece, the plurality of specified dots corresponding to the plurality of specified points, respectively.

5. An apparatus for determining, in a three-dimensional coordinate system, a pickup pose of a robot arm with a camera when an image of a workpiece is to be picked up by the camera, the workpiece being mounted on a reference plane, the apparatus comprising:

an input unit configured to input a first coordinate of the workpiece in a first axis of the three-dimensional coordinate system, the first axis being defined as orthogonal to the reference plane;

a coordinate obtaining unit configured to:

drive the robot to move the camera opposing the workpiece in the first direction such that at least part of the workpiece is captured in a field of view of the camera; and obtain second and third coordinates of a preset point of the robot arm in respective second and third axes of the three-dimensional coordinate system with the at least part of the workpiece being captured in the field of view of the camera, the second and third axes being orthogonal to the first axis, the first, second, and third coordinates being defined as coordinates of a temporally defined reference point of the workpiece in the three-dimensional coordinate system, the coordinate obtaining unit comprising:

a first driving unit configured to drive the robot to move the camera opposing the workpiece in the first direction such that the at least part of the workpiece is captured in the field of view of the camera;

a specifying unit configured to specify a plurality of desired points on the workpiece as the plurality of temporally defined reference points; and a second driving unit configured to drive the robot to move the camera such, that the optical axis of the camera passes through each of the plurality of specified points; and an obtaining unit configured to obtain the second and third coordinates of the preset point of the robot arm in the respective second and third axes of the three-dimensional coordinate system with the optical axis of the camera passing through each of the plurality of specified points, the first, second, and third coordinates for each of the plurality of specified points being defined as coordinates of a corresponding one of the plurality of temporally defined reference points of the workpiece in the three-dimensional coordinate system; and a pose determining unit configured to drive, at a given timing, the robot arm to determine a pose of the preset point of the robot arm based on a positional relationship between the first, second, and third coordinates of the temporally defined reference point of the workpiece and actual coordinates of the preset point of the robot arm, wherein the temporally defined reference point is a plurality of temporally defined reference points, and wherein the specifying unit is configured to:

pick up and display an image of the workpiece with the at least part of the workpiece being captured in the field of view of the camera; and specify a plurality of dots on the displayed image of the workpiece, the plurality of specified dots corresponding to the plurality of specified points, respectively.

6. An apparatus for determining, in a three-dimensional coordinate system, a pickup pose of a robot arm with a camera when an image of a workpiece is to be picked up by the camera, the workpiece being mounted on a reference plane, the apparatus comprising:

an input unit configured to input a first coordinate of the workpiece in a first axis of the three-dimensional coordinates stem the first axis being defined as orthogonal to the reference plane;

a coordinate obtaining unit configured to:

drive the robot to move the camera opposing the workpiece in the first direction such that at least part of the workpiece is captured in a field of view of the camera; and obtain second and third coordinates of a preset point of the robot arm in respective second and third axes of the three-dimensional coordinate system with the at least part of the workpiece being captured in the field of view of the camera, the second and third axes being orthogonal to the first axis, the first second, and third coordinates being defined as coordinates of a temporally defined reference point of the workpiece in the three-dimensional coordinate system the coordinate obtaining unit comprising:

a first driving unit configured to drive the robot to move the camera opposing the workpiece in the first direction such that the at least part of the workpiece is captured in the field of view of the camera:

a specifying unit configured to specify a plurality of groups of desired points on the workpiece: and a second driving unit configured to drive the robot to move the camera such that the optical axis of the camera passes through each of the plurality of groups of specified points; and an obtaining unit configured to:

obtain coordinates of the preset point of the robot arm in the respective second and third axes of the three-dimensional coordinate system with the optical axis of the camera passing through each of the plurality of groups of specified points; and determine coordinates of a center of each of a first figure and a second figure, the first figure being formed by connecting the coordinates of the preset point of the robot arm for the respective specified points of the first group, the second figure being formed by connecting the coordinates of the preset point of the robot arm for the respective specified points of the second group, the coordinates of the center of each of the first and second figures representing the second and third coordinates of the reset point of the robot arm for a corresponding one of the plurality of temporarily defined points; and a pose determining unit configured to drive, at a given timing, the robot arm to determine a pose of the preset point of the robot arm based on a positional relationship between the first, second, and third coordinates of the temporally defined reference point of the workpiece and actual coordinates of the preset point of the robot arm, wherein the temporally defined reference point is a plurality of temporally defined reference points, and wherein the specifying unit is configured to:

pick up and display an image of the workpiece with the at least part of the workpiece being captured in the field of view of the camera; and specify a plurality of groups of dots on or around the displayed image of the workpiece, the plurality of groups of specified dots corresponding to the plurality of groups of specified points, respectively.

* * * * *